United States Patent
Itano et al.

(10) Patent No.: US 12,480,028 B2
(45) Date of Patent: Nov. 25, 2025

(54) COMPOSITION CONTAINING REFRIGERANT, USE THEREOF, REFRIGERATOR HAVING SAME, AND OPERATION METHOD FOR SAID REFRIGERATOR

(71) Applicant: DAIKIN INDUSTRIES, LTD., Osaka (JP)

(72) Inventors: Mitsushi Itano, Osaka (JP); Kazuhiro Takahashi, Osaka (JP); Hitomi Kuroki, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 562 days.

(21) Appl. No.: 17/990,920

(22) Filed: Nov. 21, 2022

(65) Prior Publication Data
US 2023/0151256 A1 May 18, 2023

Related U.S. Application Data

(62) Division of application No. 17/254,425, filed as application No. PCT/JP2019/024822 on Jun. 21, 2019, now abandoned.

(30) Foreign Application Priority Data

Jun. 22, 2018 (JP) ................................ 2018-119328

(51) Int. Cl.
*C09K 5/04* (2006.01)
*F25B 9/00* (2006.01)

(52) U.S. Cl.
CPC .............. *C09K 5/044* (2013.01); *F25B 9/006* (2013.01); *C09K 2205/122* (2013.01); *C09K 2205/126* (2013.01); *C09K 2205/40* (2013.01)

(58) Field of Classification Search
None
See application file for complete search history.

(56) References Cited

U.S. PATENT DOCUMENTS

| | | | |
|---|---|---|---|
| 7,083,742 | B1 | 8/2006 | Nimitz |
| 2006/0033071 | A1 | 2/2006 | Wilson |
| 2011/0252801 | A1* | 10/2011 | Minor ............... C09K 23/017 60/645 |
| 2011/0253927 | A1 | 10/2011 | Minor et al. |
| 2015/0121873 | A1* | 5/2015 | Minor .................. C09K 3/30 516/8 |
| 2015/0121911 | A1* | 5/2015 | Minor .................. F25B 45/00 516/8 |
| 2017/0002245 | A1 | 1/2017 | Fukushima |
| 2018/0030324 | A1 | 2/2018 | Sethi et al. |

FOREIGN PATENT DOCUMENTS

| | | |
|---|---|---|
| CN | 101835869 | 9/2010 |
| JP | 8-277389 | 10/1996 |
| JP | 9-59612 | 3/1997 |
| JP | 2000-178543 | 6/2000 |
| JP | 2009-24152 | 2/2009 |
| WO | 2009/059106 | 5/2009 |
| WO | 2015/141678 | 9/2015 |
| WO | 2018/022888 | 2/2018 |
| WO | 2018/022943 | 2/2018 |
| WO | 2018/022949 | 2/2018 |

OTHER PUBLICATIONS

International Search Report issued Aug. 13, 2019 in International (PCT) Application No. PCT/JP2019/024822.
Partial Supplementary European Search Report issued Mar. 2, 2022 in corresponding European Patent Application No. 19822496.6.
Extended European Search Report issued Jul. 11, 2022 in European Patent Application No. 19822496.6.
Extended European Search Report issued Sep. 19, 2025 in corresponding European Patent Application No. 25182658.2.

\* cited by examiner

*Primary Examiner* — Tanisha Diggs
(74) *Attorney, Agent, or Firm* — Wenderoth, Lind & Ponack, L.L.P.

(57) ABSTRACT

The present disclosure provides a mixed refrigerant having four types of performance, i.e., an excellent coefficient of performance and refrigerating capacity that allow it to serve as an alternative refrigerant for R410A, a sufficiently low GWP, and non-flammability. Specifically, the present disclosure provides a composition comprising a refrigerant, the refrigerant comprising trifluoroiodomethane ($CF_3I$) and difluoromethane (R32), wherein the contents of $CF_3I$ and R32 in the refrigerant are respectively 48 mass %≥$CF_3I$≥46 mass % and 54 mass %≥R32≥52 mass %, based on the total amount of $CF_3I$ and R32 taken as 100 mass %.

5 Claims, 14 Drawing Sheets

COMPOSITION CONTAINING REFRIGERANT, USE THEREOF, REFRIGERATOR HAVING SAME, AND OPERATION METHOD FOR SAID REFRIGERATOR

TECHNICAL FIELD

The present disclosure relates to a composition comprising a refrigerant, use of the composition, a refrigerating machine having the composition, and a method for operating the refrigerating machine.

BACKGROUND ART

R410A is currently used as an air conditioning refrigerant for home air conditioners etc. R410A is a two-component mixed refrigerant of difluoromethane ($CH_2F_2$: R32) and pentafluoroethane ($C_2HF_5$: R125), and is a pseudo-azeotropic composition.

However, R410A has a global warming potential (GWP) of 2088. Due to the growing concerns about global warming, R32, which has a GWP of 675, has been increasingly used. For this reason, various low-GWP mixed refrigerants that can replace R410A have been proposed (PTL 1).

Further, as the prior art related to the present disclosure, PTL 2, PTL 3, and the like disclose refrigerant compositions comprising trifluoroiodomethane ($CF_3I$).

CITATION LIST

Patent Literature

PTL 1: WO2015/141678
PTL 2: JP2009-24152A
PTL 3: JPH08-277389A

SUMMARY OF INVENTION

Technical Problem

The present inventors performed independent examination, and conceived of the idea that no prior art had developed refrigerant compositions having four types of performance, i.e., an excellent coefficient of performance (COP) and refrigerating capacity (also referred to as "cooling capacity" and "capacity") that allow them to serve as alternative refrigerants for R410A, a sufficiently low GWP, and non-flammability. An object of the present disclosure is to solve this unique problem.

Solution to Problem

1. A composition comprising a refrigerant, the refrigerant comprising trifluoroiodomethane ($CF_3I$) and difluoromethane (R32), wherein the contents of $CF_3I$ and R32 in the refrigerant are respectively 48 mass %≥$CF_3I$≥46 mass % and 54 mass %≥R32≥52 mass %, based on the total amount of $CF_3I$ and R32 taken as 100 mass %.

2. A composition comprising a refrigerant, the refrigerant comprising trifluoroiodomethane ($CF_3I$), difluoromethane (R32), and pentafluoroethane (R125), wherein
when the mass % of R32, R125, and $CF_3I$ based on their sum is respectively represented by x, y, and z, coordinates (x,y,z) in a ternary composition diagram in which the sum of R32, R125, and $CF_3I$ is 100 mass % are within the range of a figure surrounded by line segments EF, FD, DX, and XE that connect the following 4 points:
point E (53.7, 11.0, 35.3),
point F (51.6, 0.0, 48.4)
point D (65.0, 0.0, 35.0), and
point X (64.6, 8.9, 26.5),
excluding the line segment FD,
the line segment EF is represented by coordinates (x, $-1.1255x^2+123.76x-3389.3$, $1.1255x^2-124.76x+3489.3$), and
the line segments FD, DX, and XE are straight lines.

3. A composition comprising a refrigerant, the refrigerant comprising trifluoroiodomethane ($CF_3I$) and trans-1,2-difluoroethylene (HFO-1132(E)), wherein the contents of $CF_3I$ and HFO-1132(E) in the refrigerant are respectively 68 mass %≥$CF_3I$≥62 mass % and 38 mass %≥HFO-1132(E)≥32 mass %, based on the total amount of $CF_3I$ and HFO-1132(E) taken as 100 mass %.

4. A composition comprising a refrigerant, the refrigerant comprising trifluoroiodomethane ($CF_3I$), difluoromethane (R32), and trans-1,2-difluoroethylene (HFO-1132(E)), wherein when the mass % of HFO-1132(E), $CF_3I$, and R32 based on their sum is respectively represented by x, y, and z, coordinates (x,y,z) in a ternary composition diagram in which the sum of HFO-1132(E), $CF_3I$, and R32 is 100 mass % are within the range of a figure surrounded by line segments JH, HY, and YJ that connect the following 3 points:
point Y (32.5, 58.1, 9.4),
point J (0.0, 77.2, 22.8), and
point H (0.0, 35.0, 65.0),
excluding the line segment JH,
the line segment YJ is represented by coordinates (x, $-0.0027x^2-0.5002x+77.2$, $0.0027x^2-0.4998x+22.8$), and
the line segments JH and HY are straight lines.

5. A composition comprising a refrigerant, the refrigerant comprising trifluoroiodomethane ($CF_3I$), difluoromethane (R32), and trifluoroethylene (HFO-1123), wherein
when the mass % of HFO-1123, $CF_3I$, and R32 based on their sum is respectively represented by x, y, and z, coordinates (x,y,z) in a ternary composition diagram in which the sum of HFO-1123, $CF_3I$, and R32 is 100 mass % are within the range of a figure surrounded by line segments ZN, NL, and LZ that connect the following 3 points:
point Z (41.6, 53.5, 4.9),
point N (0.0, 77.2, 22.8), and
point L (0.0, 35.0, 65.0),
excluding the line segment NL,
the line segment ZN is represented by coordinates (x, $-0.0007x^2-0.5402x+77.2$, $0.0007x^2-0.4598x+22.8$), and
the line segments NL and LZ are straight lines.

6. A composition comprising a refrigerant, the refrigerant comprising difluoromethane (R32), pentafluoroethane (R125), trifluoroiodomethane ($CF_3I$), and 2,3,3,3-tetrafluoroethylene (HFO-1234yf), and the refrigerant comprising one of the following refrigerants A and B:
in a ternary composition diagram in which the total concentration of R32, R125, $CF_3I$, and HFO-1234yf is 100 mass %, the concentration of HFO-1234yf is x mass %, and the total concentration of R32, R125, and $CF_3I$ is represented by (100−x) mass %,
refrigerant A having a composition ratio in which
(1)-1. 11.7 mass %≥x≥6.0 mass %, and
(1)-2. the concentration of R32, R125, and $CF_3I$ (concentration of R32 (mass %)/concentration of R125 (mass %)/concentration of $CF_3I$ (mass %)) is within the range of a quadrilateral or triangle having, as vertices, point C (1.1753x+41.14/−0.2282x+13.464/100−R1234yf−R32−R125), point D (0.0247x²+0.563x+43.733/0.0/100−R1234yf−R32−R125), point F (−0.8069x+64.948/0.0/100−R1234yf−R32−R125), and point E (−0.8247x+64.54/0.1581x+8.96/100−R1234yf−R32−R125), excluding the line segment DF; and refrigerant B having a composition ratio in which (2)-1. 12.6 mass %≥x≥11.7 mass %, and (2)-2. the concentration of R32, R125, and $CF_3I$ (concentration of R32 (mass %)/concentration of R125 (mass %)/concentration of $CF_3I$ (mass %)) is within the range of a triangle having, as vertices, point G (−1.2222x²+29.589x−123.98/20.5x²−510.15x+3173.3/100−R1234yf−R32−R125), point D (1.2213x+39.415/0.0/100−R1234yf−R32−R125), and point F (0.7787x+64.615/0.0/100−R1234yf−R32−R125), excluding the line segment DF.

7. A composition comprising a refrigerant, the refrigerant comprising difluoromethane (R32), pentafluoroethane (R125), trifluoroiodomethane ($CF_3I$), and 1,3,3,3-tetrafluoropropene (HFO-1234ze), and the refrigerant comprising one of the following refrigerants A and B:

in a ternary composition diagram in which the total concentration of R32, R125, $CF_3I$, and HFO-1234ze is 100 mass %, the concentration of HFO-1234ze is x mass %, and the total concentration of R32, R125, and $CF_3I$ is represented by (100−x) mass %, refrigerant A having a composition ratio in which (1)-1. 8.3 mass %≥x≥4.0 mass %, and (1)-2. the concentration of R32, R125, and $CF_3I$ (concentration of R32 (mass %)/concentration of R125 (mass %)/concentration of $CF_3I$ (mass %)) is within the range of a quadrilateral or triangle having, as vertices, point C (0.0435x²+1.4652x+42.543/−0.3726x+13.406/100−R1234ze−R32−R125), point D (0.097x²+0.6802x+44.628/0.0/100−R1234ze−R32−R125), point F (−0.8143x+64.967/0.0/100−R1234ze−R32−R125), and point E (−0.0061x²−0.7393x+64.254/0.1631x+8.9386/100−R1234ze−R32−R125), excluding the line segment DF; and refrigerant B having a composition ratio in which (2)-1. 8.9 mass %≥x≥8.3 mass %, and (2)-2. the concentration of R32, R125, and $CF_3I$ (concentration of R32 (mass %)/concentration of R125 (mass %)/concentration of $CF_3I$ (mass %)) is within the range of a triangle having, as vertices, point G (0.1667x+56.3/2.7778x²−64.944x+357.98/100−R1234ze−R32−R125), point D (1.5625x²−24.938x+155.98/0.0/100−R1234ze−R32−R125), and point F (−0.6667x+63.733/0.0/100−R1234ze−R32−R125), excluding the line segment DF.

8. The composition according to any one of Items 1 to 7, for use as a working fluid for a refrigerating machine, wherein the composition further comprises a refrigeration oil.

9. The composition according to any one of Items 1 to 8, for use as an alternative refrigerant for R410A.

10. Use of the composition according to any one of Items 1 to 8 as an alternative refrigerant for R410A.

11. A refrigerating machine comprising the composition according to any one of Items 1 to 9 as a working fluid.

12. A method for operating a refrigerating machine, comprising circulating the composition according to any one of Items 1 to 9 as a working fluid in a refrigerating machine.

Advantageous Effects of Invention

The refrigerant according to the present disclosure has four types of performance, i.e., an excellent coefficient of performance (COP) and refrigerating capacity that allow it to serve as an alternative refrigerant for R410A, a sufficiently low GWP, and non-flammability. Therefore, the refrigerant and composition comprising the same according to the present disclosure are useful, for example, as working fluids for refrigerating machines.

DESCRIPTION OF EMBODIMENTS

Figure 1:
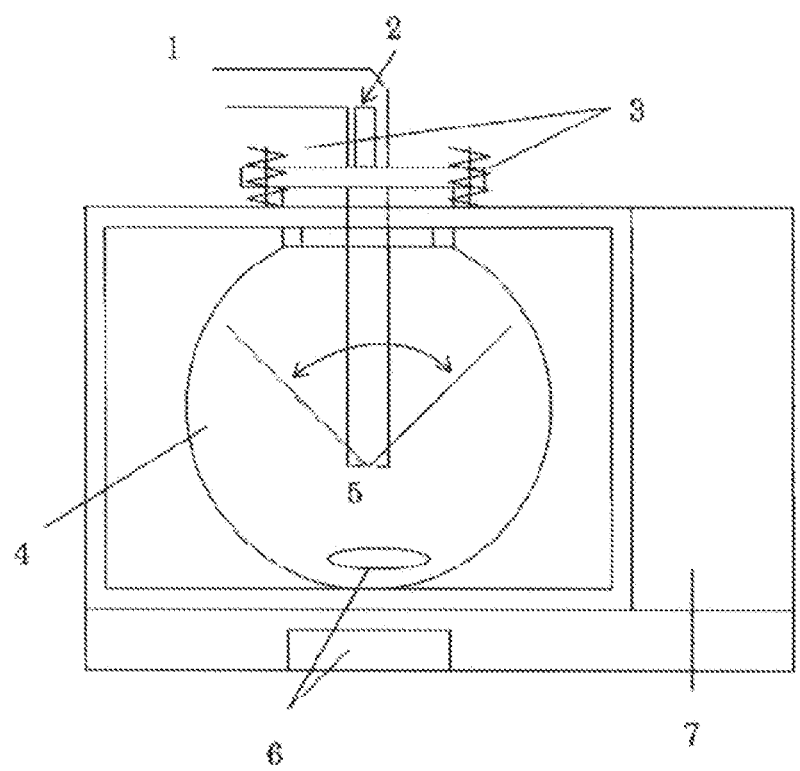
FIG. 1 is a schematic diagram of an apparatus used for a non-flammability test of refrigerants.
Figure 2:
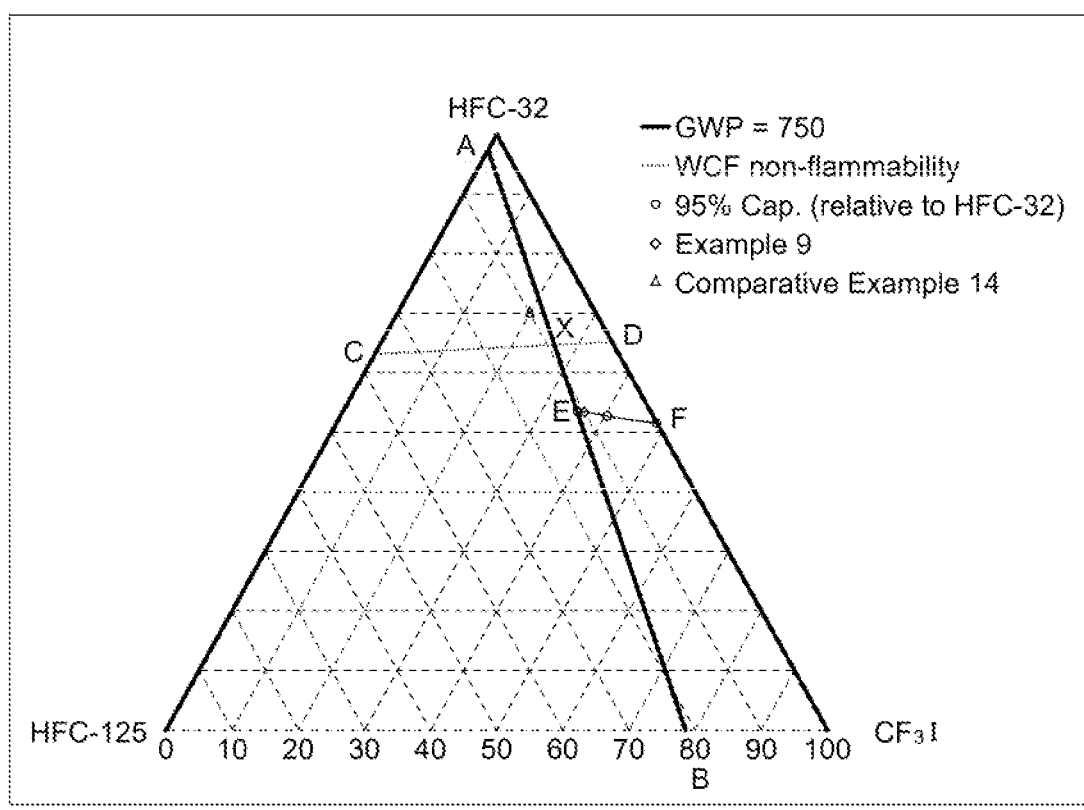
FIG. 2 is a view showing the formulation of refrigerant 2 of the present invention in a ternary composition diagram in which the sum of R32, R125, and $CF_3I$ is 100 mass % falling within the range of a figure surrounded by line segments EF, FD, DX, and XE that connect 4 points E, F, D, and X (excluding the line segment FD).
Figure 3:
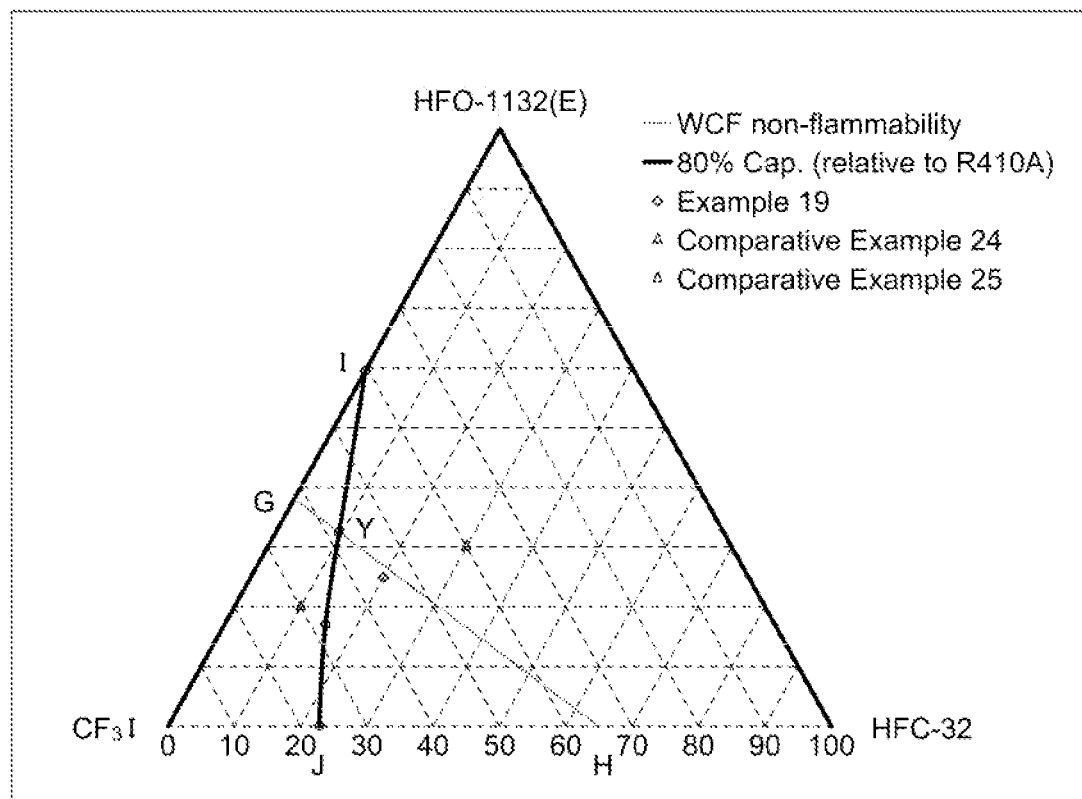
FIG. 3 is a view showing the formulation of refrigerant 4 of the present invention in a ternary composition diagram in which the sum of HFO-1132(E), $CF_3I$, and R32 is 100 mass % falling within the range of a figure surrounded by line segments JH, HY, and YJ that connect 3 points Y, J, and H (excluding the line segment JH).
Figure 4:
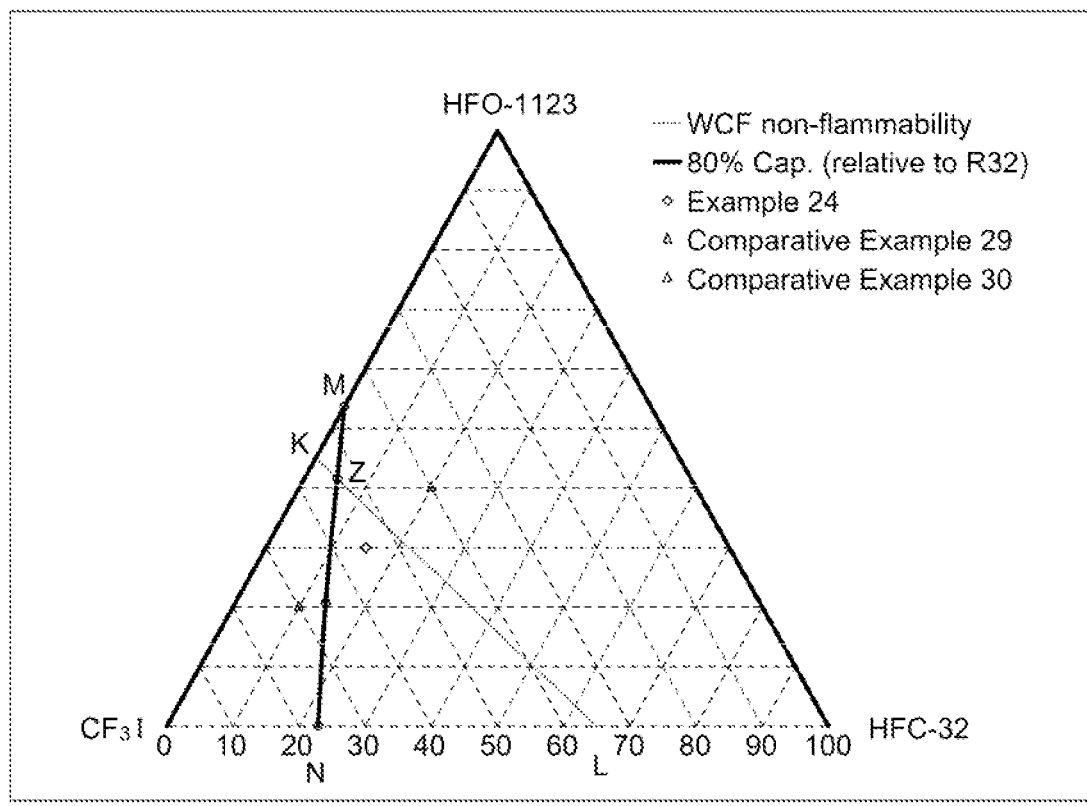
FIG. 4 is a view showing the formulation of refrigerant 5 of the present invention in a ternary composition diagram in which the sum of HFO-1123, $CF_3I$, and R32 is 100 mass % falling within the range of a figure surrounded by line segments ZN, NL, and LZ that connect 3 points Z, N, and L (excluding the line segment NL).
Figure 5:
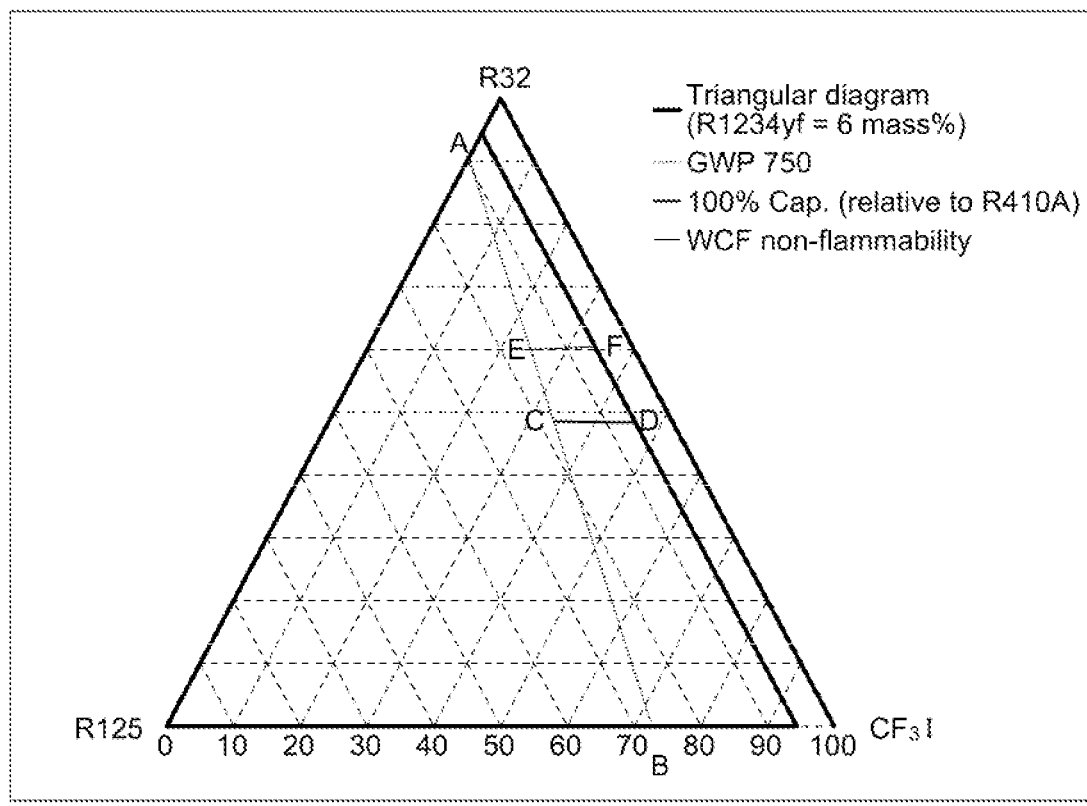
FIG. 5 is a view showing the formulation of refrigerant 6 of the present invention in a ternary composition diagram in which the total concentration of R32, R125, $CF_3I$, and HFO-1234yf is 100 mass %, the concentration of HFO-1234yf is x mass %, and the total concentration of R32, R125, and $CF_3I$ is represented by (100−x) mass %, when x=6 mass %; that is, the formulation falls within the range of a quadrilateral having, as vertices, points C, D, F, and E (excluding the line segment DF).
Figure 6:
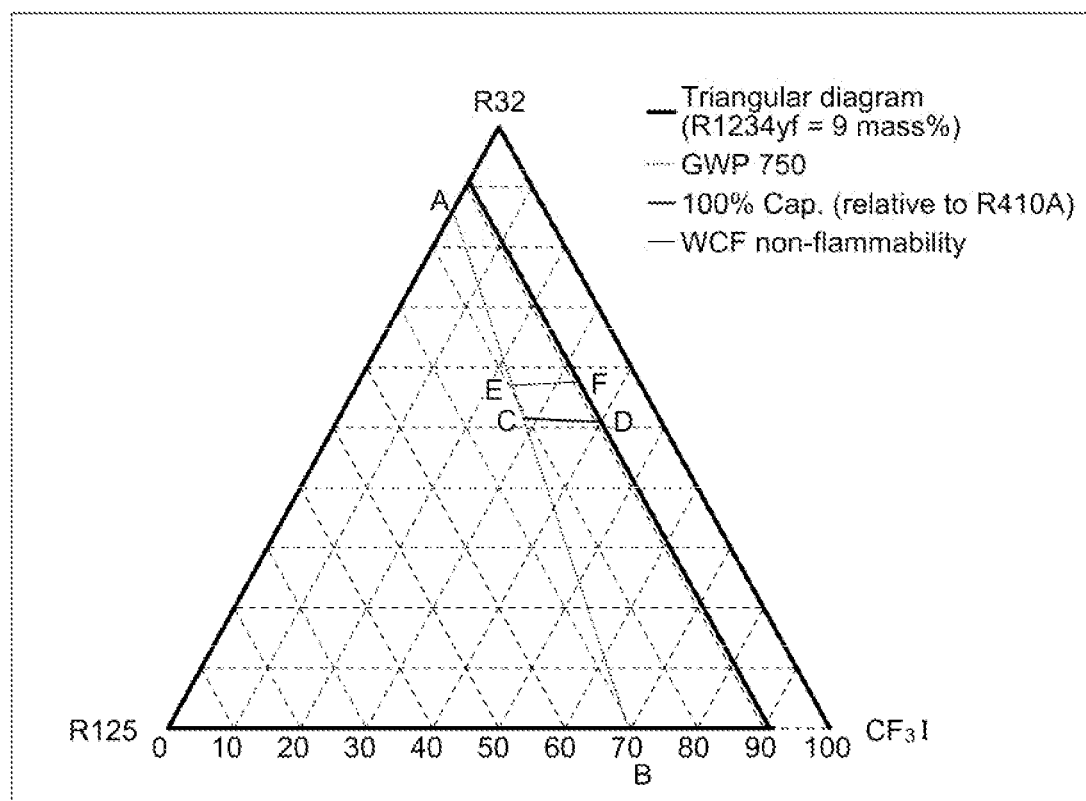
FIG. 6 is a view showing the formulation of refrigerant 6 of the present invention in a ternary composition diagram in which the total concentration of R32, R125, $CF_3I$, and HFO-1234yf is 100 mass %, the concentration of HFO-1234yf is x mass %, and the total concentration of R32, R125, and $CF_3I$ is represented by (100−x) mass %, when x=9 mass %; that is, the formulation falls within the range of a quadrilateral having, as vertices, points C, D, F, and E (excluding the line segment DF).
Figure 7:
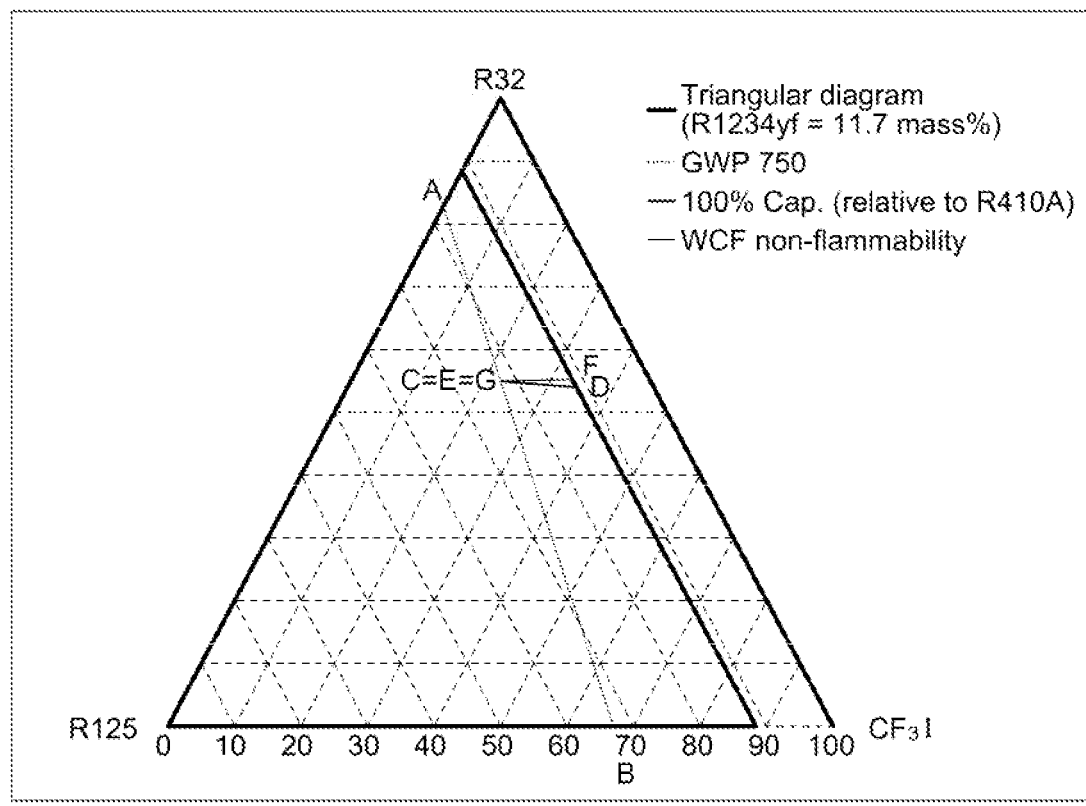
FIG. 7 is a view showing the formulation of refrigerant 6 of the present invention in a ternary composition diagram in which the total concentration of R32, R125, $CF_3I$, and HFO-1234yf is 100 mass %, the concentration of HFO-1234yf is x mass %, and the total concentration of R32, R125, and $CF_3I$ is represented by (100−x) mass %, when x=11.7 mass %; that is, the formulation falls within the range of a triangle having, as vertices, points C (=E=G), D, and F (excluding the line segment DF).
Figure 8:
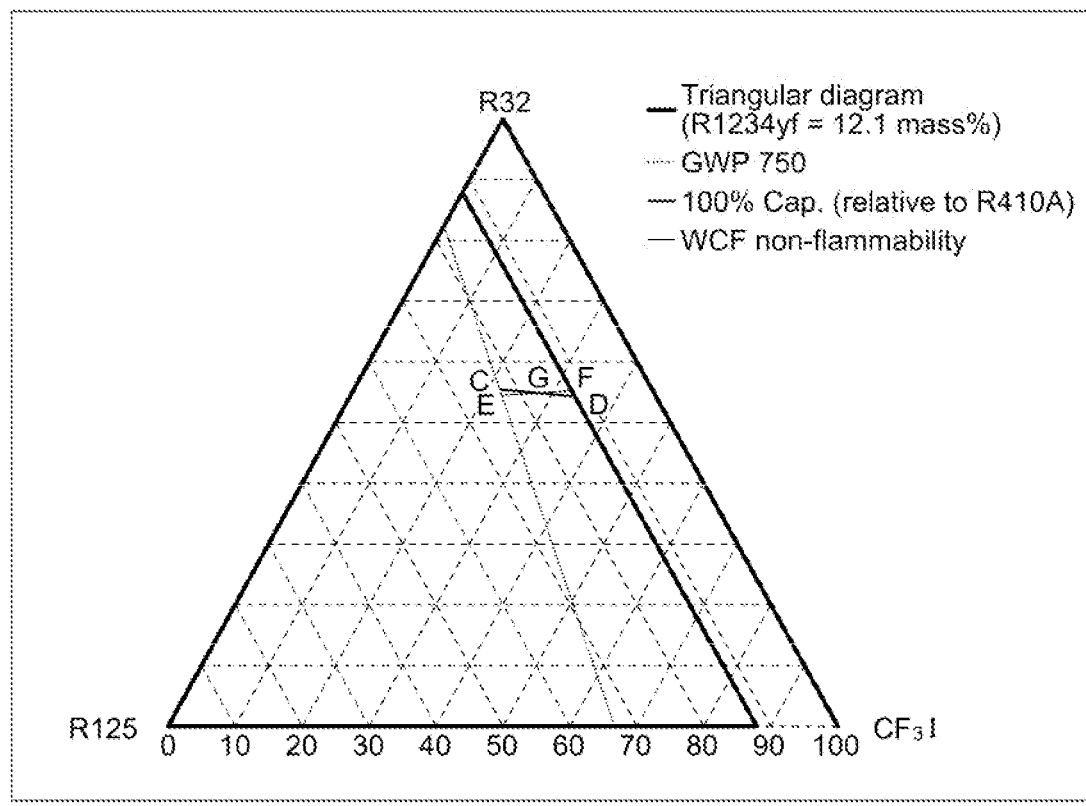
FIG. 8 is a view showing the formulation of refrigerant 6 of the present invention in a ternary composition diagram in which the total concentration of R32, R125, $CF_3I$, and HFO-1234yf is 100 mass %, the concentration of HFO-1234yf is x mass %, and the total concentration of R32, R125, and $CF_3I$ is represented by (100−x) mass %, when x=12.1 mass %; that is, the formulation falls within the range of a triangle having, as vertices, points G, D, and F (excluding the line segment DF).
Figure 9:
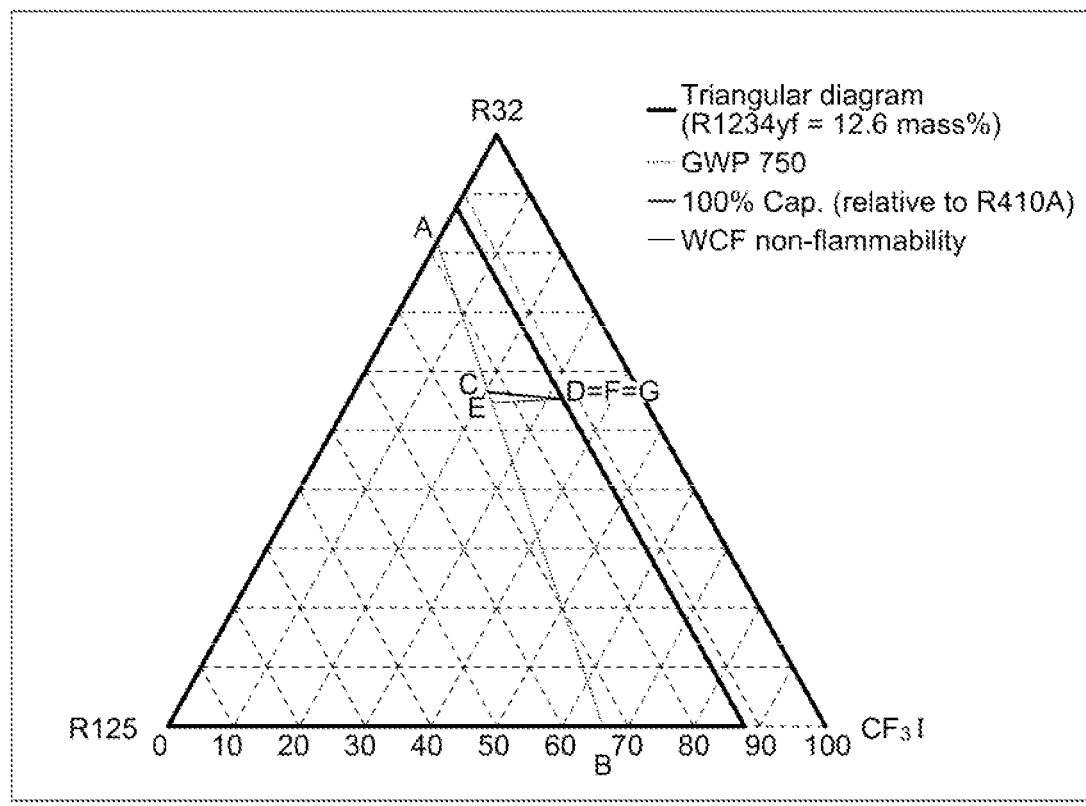
FIG. 9 is a view showing that in a ternary composition diagram in which the total concentration of R32, R125, CF$_3$I, and HFO-1234yf is 100 mass %, the concentration of HFO-1234yf is x mass %, and the total concentration of R32, R125, and CF$_3$I is represented by (100−x) mass %, when x=12.6 mass %, the formulation converges to point D (=F=G). Here, point D does not correspond to refrigerant 6 of the present invention.
Figure 10:
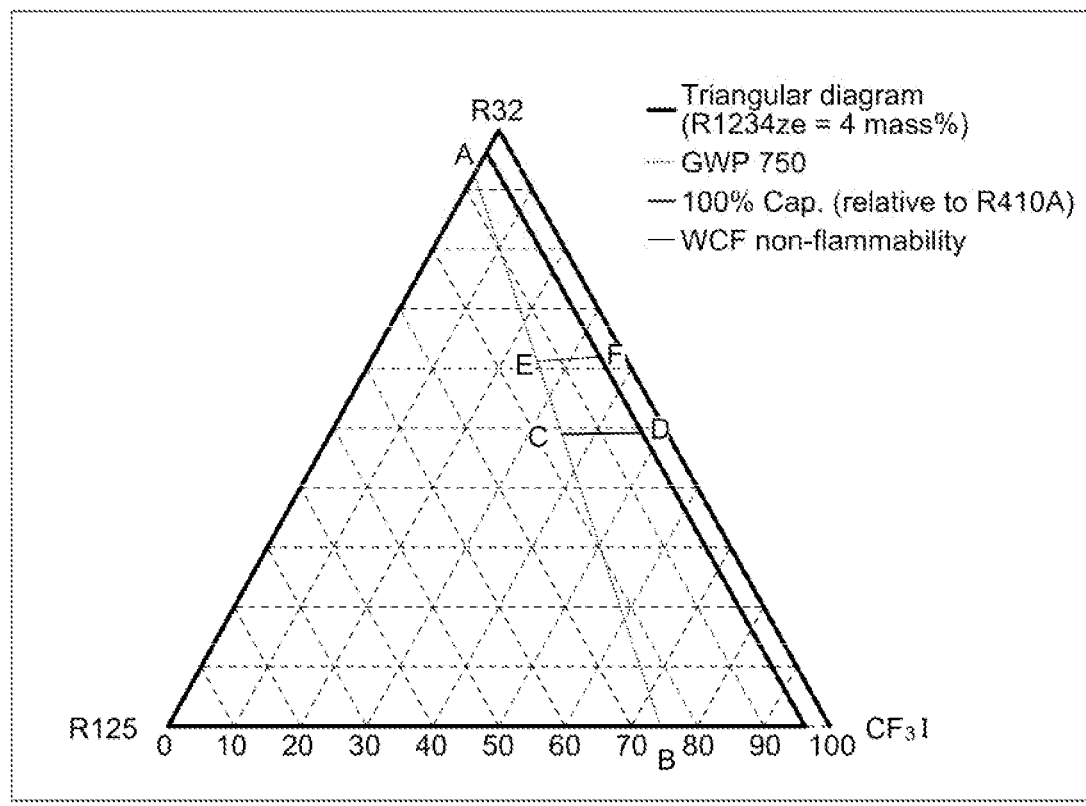
FIG. 10 is a view showing the formulation of refrigerant 7 of the present invention in a ternary composition diagram in which the total concentration of R32, R125, CF$_3$I, and HFO-1234ze is 100 mass %, the concentration of HFO-1234ze is x mass %, and the total concentration of R32, R125, and CF$_3$I is represented by (100−x) mass %, when x=4 mass %; that is, the formulation falls within the range of a quadrilateral having, as vertices, points C, D, F, and E (excluding the line segment DF).
Figure 11:
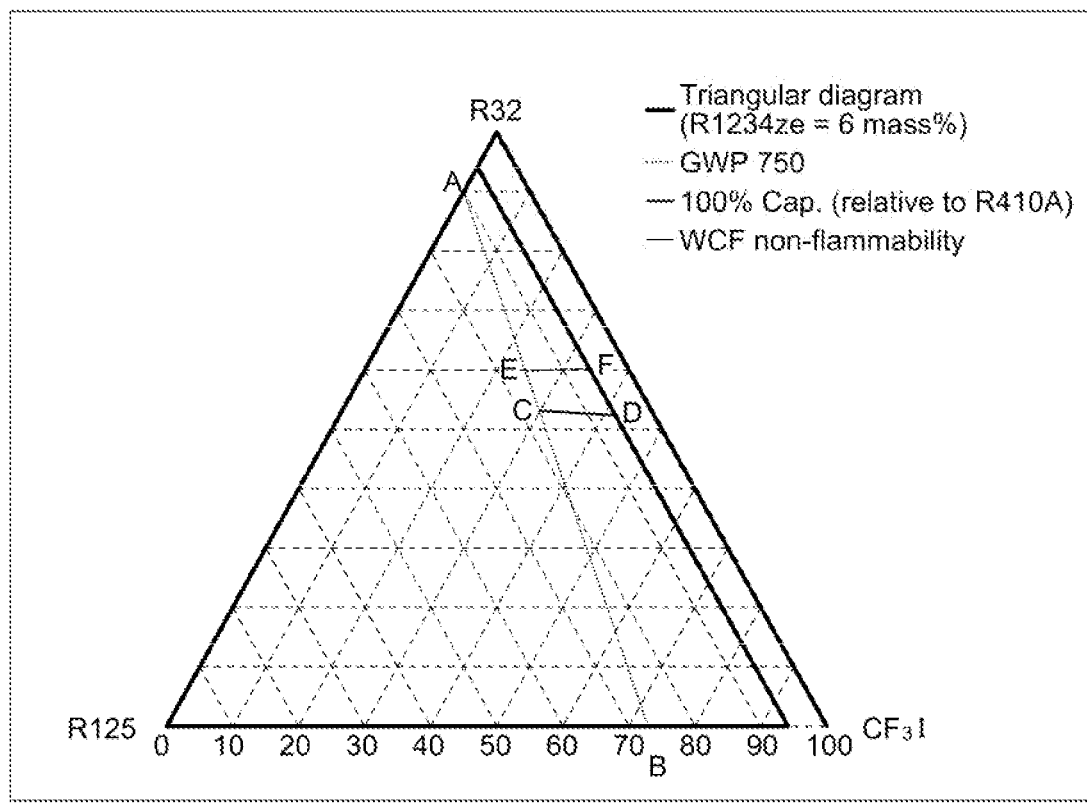
FIG. 11 is a view showing the formulation of refrigerant 7 of the present invention in a ternary composition diagram in which the total concentration of R32, R125, CF$_3$I, and HFO-1234ze is 100 mass %, the concentration of HFO-1234ze is x mass %, and the total concentration of R32, R125, and CF$_3$I is represented by (100−x) mass %, when x=6 mass %; that is, the formulation falls within the range of a quadrilateral having, as vertices, points C, D, F, and E (excluding the line segment DF).
Figure 12:
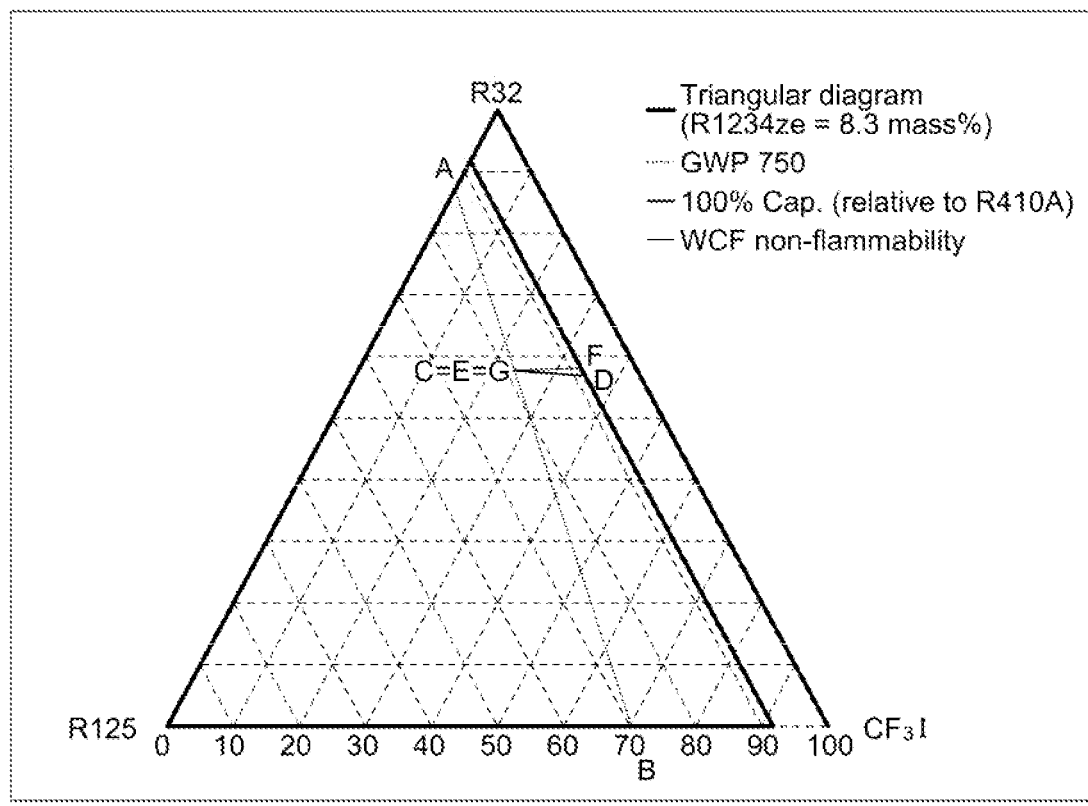
FIG. 12 is a view showing the formulation of refrigerant 7 of the present invention in a ternary composition diagram in which the total concentration of R32, R125, CF$_3$I, and HFO-1234ze is 100 mass %, the concentration of HFO-1234ze is x mass %, and the total concentration of R32, R125, and CF$_3$I is represented by (100−x) mass %, when x=8.3 mass %; that is, the formulation falls within the range of a triangle having, as vertices, points C (=E=G), D, and F (excluding the line segment DF).
Figure 13:
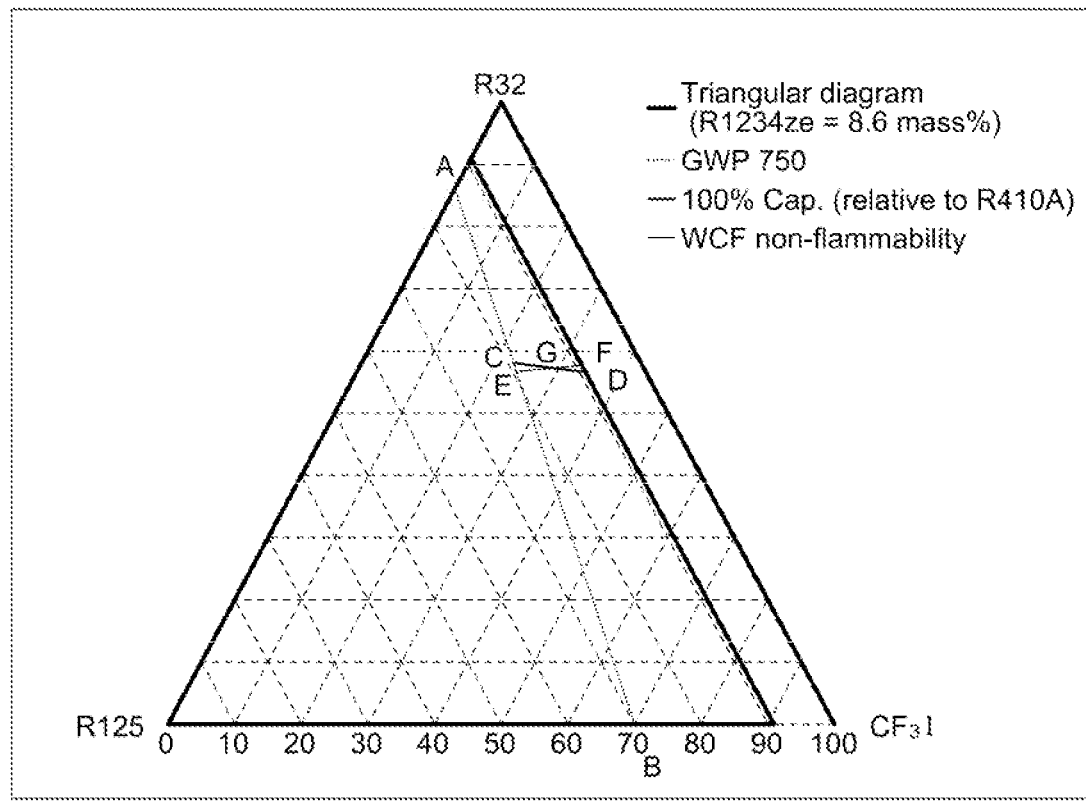
FIG. 13 is a view showing the formulation of refrigerant 7 of the present invention in a ternary composition diagram in which the total concentration of R32, R125, CF$_3$I, and HFO-1234ze is 100 mass %, the concentration of HFO-1234ze is x mass %, and the total concentration of R32, R125, and CF$_3$I is represented by (100−x) mass %, when x=8.6 mass %; that is, the formulation falls within the range of a triangle having, as vertices, points G, D, and F (excluding the line segment DF).
Figure 14:
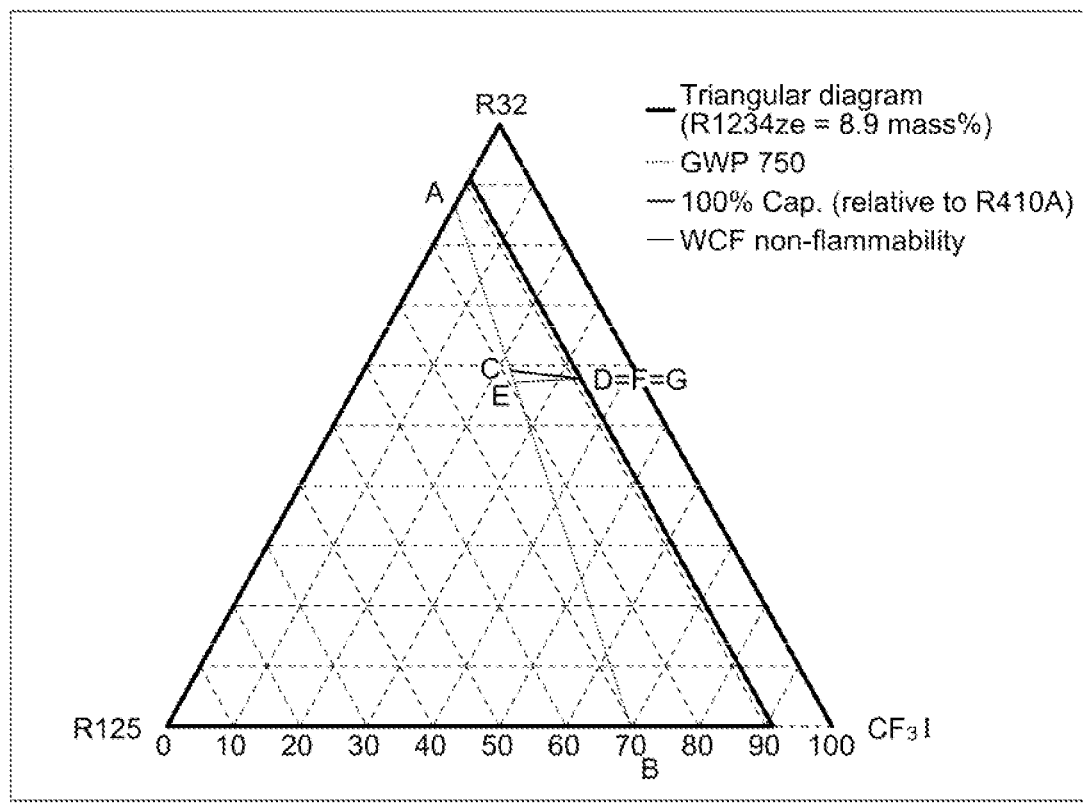
FIG. 14 is a view showing that in a ternary composition diagram in which the total concentration of R32, R125, CF$_3$I, and HFO-1234ze is 100 mass %, the concentration of HFO-1234ze is x mass %, and the total concentration of R32, R125, and CF$_3$I is represented by (100−x) mass %, when x=8.9 mass %, the formulation converges to point D (=F=G). Here, point D does not correspond to refrigerant 7 of the present invention.

The present inventors conducted intensive studies to solve the above problem, and consequently found that a refrigerant having a specific formulation comprising trifluoroiodomethane (CF$_3$I) has the properties described above.

The present disclosure has been completed as a result of further research based on this finding. The present disclosure includes the following embodiments.

Definition of Terms

In the present disclosure, the term "refrigerant" includes at least compounds that are specified in ISO 817 (International Organization for Standardization), and that are given a refrigerant number (ASHRAE number) representing the type of refrigerant with "R" at the beginning; and further includes refrigerants that have properties equivalent to those of such refrigerants, even though a refrigerant number is not yet given. Refrigerants are broadly divided into fluorocarbon compounds and non-fluorocarbon compounds in terms of the structure of the compounds. Fluorocarbon compounds include chlorofluorocarbons (CFC), hydrochlorofluorocarbons (HCFC), and hydrofluorocarbons (HFC). Non-fluorocarbon compounds include propane (R290), propylene (R1270), butane (R600), isobutane (R600a), carbon dioxide (R744), ammonia (R717), and the like.

In the present disclosure, the phrase "composition comprising a refrigerant" at least includes (1) a refrigerant itself (including a mixture of refrigerants), (2) a composition that further comprises other components and that can be mixed with at least a refrigeration oil to obtain a working fluid for a refrigerating machine, and (3) a working fluid for a refrigerating machine containing a refrigeration oil. In the present specification, of these three embodiments, the composition (2) is referred to as a "refrigerant composition" so as to distinguish it from a refrigerant itself (including a mixture of refrigerants). Further, the working fluid for a refrigerating machine (3) is referred to as a "refrigeration oil-containing working fluid" so as to distinguish it from the "refrigerant composition."

In the present disclosure, when the term "alternative" is used in a context in which the first refrigerant is replaced with the second refrigerant, the first type of "alternative" means that equipment designed for operation using the first refrigerant can be operated using the second refrigerant under optimum conditions, optionally with changes of only a few parts (at least one of the following: refrigeration oil, gasket, packing, expansion valve, dryer, and other parts) and equipment adjustment. In other words, this type of alternative means that the same equipment is operated with an alternative refrigerant. Embodiments of this type of "alternative" include "drop-in alternative," "nearly drop-in alternative," and "retrofit," in the order in which the extent of changes and adjustment necessary for replacing the first refrigerant with the second refrigerant is smaller.

The term "alternative" also includes a second type of "alternative," which means that equipment designed for operation using the second refrigerant is operated for the same use as the existing use with the first refrigerant by using the second refrigerant. This type of alternative means that the same use is achieved with an alternative refrigerant.

In the present disclosure, the term "refrigerating machine" refers to machines in general that draw heat from an object or space to make the temperature thereof lower than the temperature of ambient air, and maintain a low temperature. In other words, refrigerating machines refer to conversion machines that gain energy from the outside to do work, and that perform energy conversion, in order to transfer heat from where the temperature is lower to where the temperature is higher.

In the present disclosure, the term "non-flammable" means that, among refrigerant allowable concentrations, the worst case of formulation for flammability (WCF) is determined to be classified as "Class 1 (i.e., WCF non-flammable)" or ASHRAE non-flammable according to the US ANSI/ASHRAE Standard 34-2013.

The non-flammability is determined based on the measurement equipment and measurement method of the flammability test according to ASTM E681-2009. The measurement is specifically carried out in the following manner.

A spherical glass flask with an internal volume of 12 liters shown in FIG. 1 is used so that the state of combustion can be visually observed and video-recorded. The glass flask is configured so that gas is released from the upper lid when excessive pressure is generated by combustion. Ignition is generated by discharge from electrodes held at a height of ⅓ from the bottom. The test conditions are as follows.

Test Conditions

Test container: 280 mm-diameter spherical shape (internal volume: 12 liters)
Test temperature: 60° C.±3° C.
Pressure: 101.3 kPa±0.7 kPa
Water content: 0.0088 g±0.0005 g per gram of dry air
Binary refrigerant composition/air mixture ratio: 1 vol.% increment±0.2 vol. %
Binary refrigerant composition mixture: ±0.1 mass %
Ignition method: AC discharge, voltage 15 kV, current 30 mA, neon transformer
Electrode spacing: 6.4 mm (¼ inch)
Spark: 0.4 seconds±0.05 seconds Determination Criteria:

When the flame spreads at 90 degrees or more around the ignition point=flammable (propagation)
When the flame spreads at less than 90 degrees around the ignition point=no flame propagation (non-flammable)

1. Refrigerant
1.1 Refrigerant Component

The refrigerants according to the present disclosure can be roughly classified into Embodiments 1 to 7 (also referred to as refrigerants 1 to 7, respectively). All of refrigerants 1 to 7 have four types of performance, i.e., an excellent coefficient of performance and refrigerating capacity that allow them to serve as alternative refrigerants for R410A, a sufficiently low GWP, and non-flammability. Therefore, refrigerants 1 to 7 and the compositions comprising the same according to the present disclosure are useful, for example, as working fluids for refrigerating machines. Refrigerants 1 to 7 are described below.

Embodiment 1: Refrigerant 1

Refrigerant 1 according to the present disclosure comprises trifluoroiodomethane ($CF_3I$) and difluoromethane (R32), wherein the contents of $CF_3I$ and R32 in the refrigerant are respectively 48 mass %≥$CF_3I$≥46 mass % and 54 mass %≥R32≥52 mass %, based on the total amount of $CF_3I$ and R32 taken as 100 mass %. That is, refrigerant 1 is a mixed refrigerant.

Refrigerant 1 has four types of performance, i.e., an excellent coefficient of performance and refrigerating capacity that allow it to serve as an alternative refrigerant for R410A, a sufficiently low GWP, and non-flammability. Specifically, refrigerant 1 has a coefficient of performance of 98% or more relative to R32, a refrigerating capacity of 95% or more relative to R32, a GWP of 750 or less (particularly 400 or less), and ASHRAE non-flammability performance.

Refrigerant 1 comprises $CF_3I$ and R32, and the contents of $CF_3I$ and R32 in the refrigerant are respectively 48 mass %≥$CF_3I$≥46 mass % and 54 mass %≥R32≥52 mass % based on the total amount of $CF_3I$ and R32 taken as 100 mass %. Further, the total amount of $CF_3I$ and R32 in the entire refrigerant is preferably 99.5 mass % or more, more preferably 99.7 mass % or more, and most preferably 99.9 mass % or more. Examples of components other than $CF_3I$ and R32 in the entire refrigerant include by-products that may be inevitably contained during the production of $CF_3I$ and R32.

The ASHRAE non-flammability limit of $CF_3I$ and R32 was confirmed by the following procedure.

A leak test during storage, shipping, and use was simulated based on ANSI/ASHRAE Standard 34-2013 using Refprop 9.0 to determine the initial mixture formulation in which the worst case of fractionation for flammability (WCFF) became the non-flammability limit formulation of $CF_3I$ and R32 ($CF_3I$/R32)=(35 mass %/65 mass %); the method for determination thereof is described in Embodiment 6. As a result, the initial mixture formulation was ($CF_3I$/R32)=(46 mass %/54 mass %). This mixture formulation is the ASHRAE non-flammability limit.

Embodiment 2: Refrigerant 2

Refrigerant 2 according to the present disclosure comprises trifluoroiodomethane ($CF_3I$), difluoromethane (R32), and pentafluoroethane (R125), wherein when the mass % of R32, R125, and $CF_3I$ based on their sum is respectively represented by x, y, and z, coordinates (x,y,z) in a ternary composition diagram in which the sum of R32, R125, and $CF_3I$ is 100 mass % are within the range of a figure surrounded by line segments EF, FD, DX, and XE that connect the following 4 points:
point E (53.7, 11.0, 35.3),
point F (51.6, 0.0, 48.4)
point D (65.0, 0.0, 35.0), and
point X (64.6, 8.9, 26.5),
excluding the line segment FD,
the line segment EF is represented by coordinates (x, $-1.1255x+123.76x-3389.3$, $1.1255x=-124.76x+3489.3$), and
the line segments FD, DX, and XE are straight lines.
That is, refrigerant 2 is a mixed refrigerant.

When the above requirements are satisfied, refrigerant 2 has four types of performance, i.e., an excellent coefficient of performance and refrigerating capacity that allow it to serve as an alternative refrigerant for R410A, a sufficiently low GWP, and non-flammability. Specifically, refrigerant 2 has a coefficient of performance of 98% or more relative to R32, a refrigerating capacity of 95% or more relative to R32, a GWP of 750 or less (particularly 600 or less), and WCF non-flammability performance.

Refrigerant 2 comprises R32, R125, and $CF_3I$. In particular, the total amount of R32, R125, and $CF_3I$ in the entire refrigerant is preferably 99.5 mass % or more, more preferably 99.7 mass % or more, and most preferably 99.9 mass % or more. Examples of components other than R32, R125, and $CF_3I$ in the entire refrigerant include by-products that may be inevitably contained during the production of R32, R125, and $CF_3I$.

Embodiment 3: Refrigerant 3

Refrigerant 3 according to the present disclosure comprises trifluoroiodomethane ($CF_3I$) and trans-1,2-difluoroethylene (HFO-1132(E)), wherein the contents of $CF_3I$ and HFO-1132(E) in the refrigerant are respectively 68 mass %≥$CF_3I$≥62 mass % and 38 mass %≥HFO-1132(E)≥32 mass %, based on the total amount of $CF_3I$ and HFO-1132 (E) taken as 100 mass %. That is, refrigerant 3 is a mixed refrigerant.

Refrigerant 3 has four types of performance, i.e., an excellent coefficient of performance and refrigerating capacity that allow it to serve as an alternative refrigerant for R410A, a sufficiently low GWP, and non-flammability. Specifically, refrigerant 3 has a coefficient of performance of 100% or more (particularly 105% or more) relative to R410A, a refrigerating capacity of 65% or more relative to R410A, a GWP of 1 or less, and WCF non-flammability performance.

Refrigerant 3 comprises $CF_3I$ and HFO-1132(E), and the contents of $CF_3I$ and HFO-1132(E) in the refrigerant are respectively 68 mass %≥$CF_3I$≥62 mass % and 38 mass %≥HFO-1132(E)≥32 mass %, based on the total amount of $CF_3I$ and HFO-1132(E) taken as 100 mass %. Further, the total amount of $CF_3I$ and HFO-1132(E) in the entire refrigerant is preferably 99.5 mass % or more, more preferably 99.7 mass % or more, and most preferably 99.9 mass % or more. Examples of components other than $CF_3I$ and HFO-1132(E) in the entire refrigerant include by-products that may be inevitably contained during the production of $CF_3I$ and HFO-1132(E).

Embodiment 4: Refrigerant 4

Refrigerant 4 according to the present disclosure comprises trifluoroiodomethane ($CF_3I$), difluoromethane (R32), and trans-1,2-difluoroethylene (HFO-1132(E)), wherein when the mass % of HFO-1132(E), $CF_3I$, and R32 based on their sum is respectively represented by x, y, and z, coordinates (x,y,z) in a ternary composition diagram in which the sum of HFO-1132(E), $CF_3I$, and R32 is 100 mass % are within the range of a figure surrounded by line segments JH, HY, and YJ that connect the following 3 points:

point Y (32.5, 58.1, 9.4), point J (0.0. 77.2, 22.8), and point H (0.0. 35.0, 65.0), excluding the line segment JH, the line segment YJ is represented by coordinates (x, $-0.0027x^2-0.5002x+77.2$, $0.0027x^2-0.4998x+22.8$), and the line segments JH and HY are straight lines.

That is, refrigerant 4 is a mixed refrigerant.

When the above requirements are satisfied, refrigerant 4 has four types of performance, i.e., an excellent coefficient of performance and refrigerating capacity that allow it to serve as an alternative refrigerant for R410A, a sufficiently low GWP, and non-flammability. Specifically, refrigerant 4 has a coefficient of performance of 99% or more relative to R32, a refrigerating capacity of 80% or more relative to R32, a GWP of 750 or less (particularly 450 or less), and WCF non-flammability performance.

Refrigerant 4 comprises HFO-1132(E), $CF_3I$, and R32. In particular, the total amount of HFO-1132(E), $CF_3I$, and R32 in the entire refrigerant is preferably 99.5 mass % or more, more preferably 99.7 mass % or more, and most preferably 99.9 mass % or more. Examples of components other than HFO-1132(E), $CF_3I$, and R32 in the entire refrigerant include by-products that may be inevitably contained during the production of HFO-1132(E), $CF_3I$, and R32.

Embodiment 5: Refrigerant 5

Refrigerant 5 according to the present disclosure comprises trifluoroiodomethane ($CF_3I$), difluoromethane (R32), and trifluoroethylene (HFO-1123), wherein when the mass % of HFO-1123, $CF_3I$, and R32 based on their sum is respectively represented by x, y, and z, coordinates (x,y,z) in a ternary composition diagram in which the sum of HFO-1123, $CF_3I$, and R32 is 100 mass % are within the range of a figure surrounded by line segments ZN, NL, and LZ that connect the following 3 points:

point Z (41.6, 53.5, 4.9), point N (0.0. 77.2, 22.8), and point L (0.0. 35.0, 65.0), excluding the line segment NL, the line segment ZN is represented by coordinates (x, $-0.0007x^2-0.5402x+77.2$, $0.0007x^2-0.4598x+22.8$), and the line segments NL and LZ are straight lines.

That is, refrigerant 5 is a mixed refrigerant.

When the above requirements are satisfied, refrigerant 5 has four types of performance, i.e., an excellent coefficient of performance and refrigerating capacity that allow it to serve as an alternative refrigerant for R410A, a sufficiently low GWP, and non-flammability. Specifically, refrigerant 5 has a coefficient of performance of 99% or more relative to R32, a refrigerating capacity of 80% or more relative to R32, a GWP of 750 or less (particularly 450 or less), and WCF non-flammability performance.

Refrigerant 5 comprises HFO-1123, $CF_3I$, and R32. In particular, the total amount of HFO-1123, $CF_3I$, and R32 in the entire refrigerant is preferably 99.5 mass % or more, more preferably 99.7 mass % or more, and most preferably 99.9 mass % or more. Examples of components other than HFO-1123, $CF_3I$, and R32 in the entire refrigerant include by-products that may be inevitably contained during the production of HFO-1123, $CF_3I$, and R32.

Embodiment 6: Refrigerant 6

Refrigerant 6 according to the present disclosure comprises difluoromethane (R32), pentafluoroethane (R125), trifluoroiodomethane ($CF_3I$), and 2,3,3,3-tetrafluoroethylene (HFO-1234yf), and refrigerant 6 comprises one of the following refrigerants A and B:

in a ternary composition diagram in which the total concentration of R32, R125, $CF_3I$, and HFO-1234yf is 100 mass %, the concentration of HFO-1234yf is x mass %, and the total concentration of R32, R125, and $CF_3I$ is represented by (100−x) mass %, refrigerant A having a composition ratio in which (1)-1. 11.7 mass %≥x≥6.0 mass %, and (1)-2. the concentration of R32, R125, and $CF_3I$ (concentration of R32 (mass %)/concentration of R125 (mass %)/concentration of $CF_3I$ (mass %)) is within the range of a quadrilateral or triangle having, as vertices, point C ($1.1753x+41.14$/$-0.2282x+13.464$/100−R1234yf−R32−R125), point D ($0.0247x^2+0.563x+43.733$/0.0/100−R1234yf−R32−R125), point F ($-0.8069x+64.948$/0.0/100−R1234yf−R32−R125), and point E ($-0.8247x+64.54$/$0.1581x+8.96$/100−R1234yf−R32−R125), excluding the line segment DF; and refrigerant B having a composition ratio in which (2)-1. 12.6 mass %≥x≥11.7 mass %, and (2)-2. the concentration of R32, R125, and $CF_3I$ (concentration of R32 (mass %)/concentration of R125 (mass %)/concentration of $CF_3I$ (mass %)) is within the range of a triangle having, as vertices, point G ($-1.2222x^2+29.589x-123.98$/$20.5x^2-510.15x+3173.3$/100−R1234yf−R32−R125), point D ($1.2213x+39.415$/0.0/100−R1234yf−R32−R125), and point F ($0.7787x+64.615$/0.0/100−R1234yf−R32−R125), excluding the line segment DF.

That is, refrigerant 6 is a mixed refrigerant.

When the above requirements are satisfied in the case in which the concentration x of HFO-1234yfx is (1) 11.7 mass %≥x≥6.0 mass % or (2) 12.6 mass %≥x≥11.7 mass %, refrigerant 6 has four types of performance, i.e., an excellent coefficient of performance and refrigerating capacity that allow it to serve as an alternative refrigerant for R410A, a sufficiently low GWP, and non-flammability. Specifically, refrigerant 6 has a coefficient of performance of 100% or more relative to R410A, a refrigerating capacity of 100% or more relative to R410A, a GWP of 750 or less, and WCF non-flammability performance.

Refrigerant 6 comprises R32, R125, $CF_3I$, and HFO-1234yf. In particular, the total amount of R32, R125, $CF_3I$, and HFO-1234yf in the entire refrigerant is preferably 99.5 mass % or more, more preferably 99.7 mass % or more, and most preferably 99.9 mass % or more. Examples of components other than R32, R125, $CF_3I$, and HFO-1234yf in the entire refrigerant include by-products that may be inevitably contained during the production of R32, R125, $CF_3I$, and HFO-1234yf.

The following describes the methods for determining points A, B, C, D, E, F, and G, which are classified according to the range of x. The technical meanings of points A, B, C, D, E, F, and G are as follows. Further, the concentration at each point is a value obtained in the Examples of Embodiment 6 (refrigerant 6) described later.

A: a composition ratio in which GWP=750, and the concentration of $CF_3I$ (mass %) is 0.0 mass %
B: a composition ratio in which GWP=750, and the concentration of R32 (mass %) is 0.0 mass %
C: a composition ratio in which the refrigerating capacity relative to R410A is 100% (a refrigerating capacity of 100% relative to R410A), and GWP=750
D: a composition ratio in which the refrigerating capacity relative to R410A is 100% (a refrigerating capacity of 100% relative to R410A), and the concentration of R125 (mass %) is 0.0 mass %
E: a WCF non-flammable composition ratio in which GWP=750
F: a WCF non-flammable composition ratio in which the concentration of R125 (mass %) is 0.0 mass %
G: a WCF non-flammable composition ratio in which the refrigerating capacity relative to R410A is 100% (a refrigerating capacity of 100% relative to R410A)

(1) Method for Determining Points C, D, E, F, and G
(1-1) Point C
11.7 Mass %≥x≥6.0 Mass %

When the concentration of HFO-1234yf is 6.0 mass %, point C on a ternary composition diagram in which the total concentration of R32, R125, and $CF_3I$ is (100−x) mass % is concentration of R32 (mass %)/concentration of R125 (mass %)/concentration of $CF_3I$ (mass %)=(48.2/12.1/33.7);

when the concentration of HFO-1234yf is 9.0 mass %, point C on the ternary composition diagram in which the total concentration of R32, R125, and $CF_3I$ is (100−x) mass % is concentration of R32 (mass %)/concentration of R125 (mass %)/concentration of $CF_3I$ (mass %)=(51.7/11.4/27.9); and when the concentration of HFO-1234yf is 11.7 mass %, point C on the ternary composition diagram in which the total concentration of R32, R125, and $CF_3I$ is (100−x) mass % is (concentration of R32 (mass %)/concentration of R125 (mass %)/concentration of $CF_3I$ (mass %))=(54.9/10.8/22.6).

Therefore, when the total concentration of R32, R125, $CF_3I$, and HFO-1234yf is 100 mass %, assuming that the concentration of R32 is y mass %, the equation of the regression line obtained from the above three points plotted in the xy coordinates is represented by y=1.1753x+41.14.

Moreover, assuming that the concentration of R125 is y mass %, the equation of the regression line obtained in the same manner is represented by y=−0.2282x+13.464.

Therefore, the concentration of $CF_3I$ at point C is (100−R1234yf−R32−R125).

Form the above, point C on the ternary composition diagram in which the total concentration of R32, R125, and $CF_3I$ is (100−x) (concentration of R32 (mass %)/concentration of R125 (mass %)/concentration of $CF_3I$ (mass %)) is represented by (1.1753x+41.14/−0.2282x+13.464/100−R1234yf−R32−R125).

12.6 Mass %≥x≥11.7 Mass %

The same calculation was performed for the above range of x. Table 1 below shows the results of point C (concentration of R32 (mass %)/concentration of R125 (mass %)/concentration of $CF_3I$ (mass %)) for each concentration range of x.

TABLE 1

| | Point C | | | | | |
|---|---|---|---|---|---|---|
| Item | 11.7 ≥ R1234yf ≥ 6.0 | | | 12.6 ≥ R1234yf ≥ 11.7 | | |
| R1234yf | 6.0 | 9.0 | 11.7 | 11.7 | 12.1 | 12.6 |
| R32 | 48.2 | 51.7 | 54.9 | 54.9 | 55.5 | 56.4 |
| R125 | 12.1 | 11.4 | 10.8 | 10.8 | 10.7 | 10.5 |
| CF3I | 33.7 | 27.9 | 22.6 | 22.6 | 21.7 | 20.4 |
| R1234yf | x | | | x | | |
| R32 approximate expression | 1.1753x + 41.14 | | | 1.6721x + 35.311 | | |
| R125 approximate expression | −0.2282x + 13.464 | | | −0.3361x + 14.744 | | |
| CF3I approximate expression | 100-R1234yf-R32-R125 | | | 100-R1234yf-R32-R125 | | |

(1-2) Points D, E, F, and G

Points D, E, F, and G were determined below in the same manner as in the case of point C. The results are shown in Tables 2 to 5 below.

TABLE 2

| | Point D | | | | | |
|---|---|---|---|---|---|---|
| Item | 11.7 ≥ R1234yf ≥ 6.0 | | | 12.6 ≥ R1234yf ≥ 11.7 | | |
| R1234yf | 6.0 | 9.0 | 11.7 | 11.7 | 12.1 | 12.6 |
| R32 | 48.0 | 50.8 | 53.7 | 53.7 | 54.8 | 54.8 |
| R125 | 0 | 0 | 0 | 0 | 0 | 0 |
| CF3I | 46.0 | 40.2 | 34.6 | 34.6 | 32.6 | 32.6 |
| R1234yf | x | | | x | | |
| R32 approximate expression | 0.0247x² + 0.563x + 43.733 | | | 1.2213x + 39.415 | | |
| R125 approximate expression | 0 | | | 0 | | |
| CF3I approximate expression | 100-R1234yf-R32-R125 | | | 100-R1234yf-R32-R125 | | |

TABLE 3

| | Point E | | | | | |
|---|---|---|---|---|---|---|
| Item | 11.7 ≥ R1234yf ≥ 6.0 | | | 12.6 ≥ R1234yf ≥ 11.7 | | |
| R1234yf | 6.0 | 9.0 | 11.7 | 11.7 | 12.1 | 12.6 |
| R32 | 59.6 | 57.1 | 54.9 | 54.9 | 54.6 | 54.2 |
| R125 | 9.9 | 10.4 | 10.8 | 10.8 | 10.9 | 10.9 |
| CF3I | 24.5 | 23.5 | 22.6 | 22.6 | 22.4 | 22.3 |
| R1234yf | x | | | x | | |
| R32 approximate expression | −0.8247x + 64.54 | | | −0.7787x + 64.015 | | |
| R125 approximate expression | 0.1581x + 8.96 | | | 0.1066x + 9.5738 | | |
| CF3I approximate expression | 100-R1234y-R32-R125 | | | 100-R1234yf-R32-R125 | | |

TABLE 4

Point F

| Item | 11.7 ≥ R1234yf ≥ 6.0 | | | 12.6 ≥ R1234yf ≥ 11.7 | | |
|---|---|---|---|---|---|---|
| R1234yf | 6.0 | 9.0 | 11.7 | 11.7 | 12.1 | 12.6 |
| R32 | 60.1 | 57.7 | 55.5 | 55.5 | 55.2 | 54.8 |
| R125 | 0 | 0 | 0 | 0 | 0 | 0 |
| CF3I | 33.9 | 33.3 | 32.8 | 32.8 | 32.7 | 32.6 |
| R1234yf | x | | | x | | |
| R32 approximate expression | −0.8069x + 64.948 | | | −0.7787x + 64.615 | | |
| R125 approximate expression | 0 | | | 0 | | |
| CF3I approximate expression | 100-R1234y-R32-R125 | | | 100-R1234yf-R32-R125 | | |

TABLE 5

Point G

| Item | 12.6 ≥ R1234yf ≥ 11.7 | | |
|---|---|---|---|
| R1234yf | 11.7 | 12.1 | 12.6 |
| R32 | 54.9 | 55.1 | 54.8 |
| R125 | 10.8 | 1.9 | 0 |
| CF3I | 22.6 | 30.9 | 32.6 |
| R1234yf | x | | |
| R32 approximate expression | −1.2222x2 + 29.589x −123.98 | | |
| R125 approximate expression | 20.5x2 − 510.15x + 3173.3 | | |
| CF3I approximate expression | 100 − R1234ze − R32 − R125 | | |

On the ternary composition diagram in which the total concentration of R32, R125, and $CF_3I$ is (100−x), a set of points with GWP=7500 is represented by a straight line connecting points A and B, which are presented as functions of x when HFO-1234yf=x. For example, on the ternary composition diagrams of FIGS. 5 to 9, GWP is 750 or less in the regions on the vertex side of $CF_3I$ with respect to the straight line.

Further, on the ternary composition diagram in which the total concentration of R32, R125, and $CF_3I$ is (100−x), a set of points with a refrigerating capacity of 100% relative to R410A is approximated to a straight line connecting points C and D, which are presented as functions of x when HFO-1234yf=x. For example, on the ternary composition diagrams of FIGS. 5 to 9, the refrigerating capacity relative to R410A is 100% or more in the regions on the vertex side of R32 with respect to the approximate line.

Moreover, on the ternary composition diagram in which the total concentration of R32, R125, and $CF_3I$ is (100−x), a set of points with WCF non-flammability is approximated to a straight line connecting points E and F, which are presented as functions of x when HFO-1234yf=x. For example, on the ternary composition diagrams of FIGS. 5 to 9, it is WCF non-flammable in the regions on the vertex side of $CF_3I$ with respect to the approximate line.

Non-Flammability Limit (Identification of Line Segment EF)

First, the non-flammability limit of a binary mixed refrigerant of a flammable refrigerant (R32, 1234yf) and a non-flammable refrigerant ($CF_3I$, R125) was identified.

The non-flammability limit of the binary mixed refrigerant was determined based on the measurement equipment and measurement method of the flammability test according to ASTM E681-2009 (details are as described above).

As a result, in the mixed refrigerant of flammable refrigerant R32 and non-flammable refrigerant $CF_3I$, no flame propagation was observed from R32=65.0 wt % and $CF_3I$=35.0 wt %, and this formulation was regarded as the non-flammability limit. Further, no flame propagation was observed from R32=63.0 wt % and R125=37.0 wt % in the mixed refrigerant of flammable refrigerant R32 and non-flammable refrigerant R125, from 1234yf=80.0 wt % and $CF_3I$=20.0 wt % in the mixed refrigerant of flammable refrigerant 1234yf and non-flammable refrigerant $CF_3I$, and from 1234yf=79.0 wt % and R125=21.0 wt % in the mixed refrigerant of flammable refrigerant 1234yf and non-flammable refrigerant R125. These formulations were regarded as the non-flammability limits. The results are summarized in Table 6.

TABLE 6

| Item | Flammable refrigerant | Non-flammable refrigerant |
|---|---|---|
| Combination in binary mixed refrigerant | R32 | CF3I |
| Non-flammability limit (wt. %) | 65.0 | 35.0 |
| Combination in binary mixed refrigerant | R32 | R125 |
| Non-flammability limit (wt. %) | 63.0 | 37.0 |
| Combination in binary mixed refrigerant | 1234yf | CF3I |
| Non-flammability limit (wt. %) | 80.0 | 20.0 |
| Combination in binary mixed refrigerant | 1234yf | R125 |
| Non-flammability limit (wt. %) | 79.0 | 21.0 |

Points E and F showing the non-flammability limit were identified in such a manner that in the relationships of R32-equivalent flammable refrigerant concentration=R32+(63/37)*(21/79)*R1234yf and R32-equivalent non-flammable refrigerant concentration=(63/37)*R125+(65/35)*$CF_3I$, a case in which R32-equivalent flammable refrigerant concentration−non-flammable refrigerant concentration<0 was determined to be non-flammable, and a case in which R32-equivalent flammable refrigerant concentration−non-flammable refrigerant concentration>0 was determined to be flammable.

Table 7 shows the details of points E and F. Line segment EF is a regression line connecting these two points E and F.

TABLE 7

Point E

| R32 mass % | R125 mass % | CF3I mass % | R1234yf mass % | Flammable refrigerant concentration in terms of R32 mass % | Non-flammable refrigerant concentration in terms of R32 mass % | Flammability-non-flammability mass % | Determination |
|---|---|---|---|---|---|---|---|
| 59.6 | 9.9 | 24.5 | 6.0 | 62.316 | 62.357 | −0.041 | Non-flammable |
| 59.7 | 9.9 | 24.4 | 6.0 | 62.416 | 62.171 | 0.245 | Flammable |

TABLE 7-continued

| R32 mass % | R125 mass % | CF3I mass % | R1234yf mass % | Flammable refrigerant concentration in terms of R32 mass % | Non-flammable refrigerant concentration in terms of R32 mass % | Flammability-non-flammability mass % | Determination |
|---|---|---|---|---|---|---|---|
| 57.1 | 10.4 | 23.5 | 9.0 | 61.174 | 61.351 | −0.177 | Non-flammable |
| 57.2 | 10.4 | 23.4 | 9.0 | 61.274 | 61.165 | 0.108 | Flammable |
| 54.9 | 10.8 | 22.6 | 11.7 | 60.196 | 60.361 | −0.165 | Non-flammable |
| 55.0 | 10.8 | 22.5 | 11.7 | 60.296 | 60.175 | 0.121 | Flammable |
| 54.6 | 10.9 | 22.4 | 12.1 | 60.077 | 60.159 | −0.083 | Non-flammable |
| 54.5 | 10.9 | 22.3 | 12.1 | 59.977 | 59.974 | 0.003 | Flammable |
| 54.2 | 10.9 | 22.3 | 12.6 | 59.903 | 59.974 | −0.071 | Non-flammable |
| 54.3 | 10.9 | 22.2 | 12.6 | 60.003 | 59.788 | 0.215 | Flammable |

Point F

| R32 mass % | R125 mass % | CF3I mass % | R1234yf mass % | Flammable refrigerant concentration in terms of R32 mass % | Non-flammable refrigerant concentration in terms of R32 mass % | Flammability-non-flammability mass % | Determination |
|---|---|---|---|---|---|---|---|
| 60.1 | 0 | 33.9 | 6 | 62.816 | 62.957 | −0.141 | Non-flammable |
| 60.2 | 0 | 33.8 | 6 | 62.916 | 62.771 | 0.144 | Flammable |
| 57.7 | 0 | 33.3 | 9 | 61.774 | 61.843 | −0.069 | Non-flammable |
| 57.8 | 0 | 33.2 | 9 | 61.874 | 61.657 | 0.216 | Flammable |
| 55.5 | 0 | 32.8 | 11.7 | 60.796 | 60.914 | −0.119 | Non-flammable |
| 55.6 | 0 | 32.7 | 11.7 | 60.896 | 60.729 | 0.167 | Flammable |
| 55.2 | 0 | 32.7 | 12.1 | 60.677 | 60.729 | −0.052 | Non-flammable |
| 55.3 | 0 | 32.6 | 12.1 | 60.777 | 60.543 | 0.234 | Flammable |
| 54.8 | 0 | 32.6 | 12.6 | 60.503 | 60.543 | −0.040 | Non-flammable |
| 54.9 | 0 | 32.5 | 12.6 | 60.603 | 60.357 | 0.246 | Flammable |

Embodiment 7: Refrigerant 7

Refrigerant 7 according to the present disclosure comprises difluoromethane (R32), pentafluoroethane (R125), trifluoroiodomethane ($CF_3I$), and 1,3,3,3-tetrafluoropropene (HFO-1234ze), and refrigerant 7 comprises at least one of the following refrigerants A and B:

in a ternary composition diagram in which the total concentration of R32, R125, $CF_3I$, and HFO-1234ze is 100 mass %, the concentration of HFO-1234ze is x mass %, and the total concentration of R32, R125, and $CF_3I$ is represented by (100−x) mass %, refrigerant A having a composition ratio in which
(1)-1. 8.3 mass % ≥ x ≥ 4.0 mass %, and
(1)-2. the concentration of R32, R125, and $CF_3I$ (concentration of R32 (mass %)/concentration of R125 (mass %)/concentration of $CF_3I$ (mass %)) is within the range of a quadrilateral or triangle having, as vertices, point C ($0.0435x^2+1.4652x+42.543/-0.3726x+13.406/100-$R1234ze−R32−R125), point D ($0.097x=+0.6802x+44.628/0.0/100-$R1234ze−R32−R125), point F ($-0.8143x+64.967/0.0/100-$R1234ze−R32−R125), and point E ($-0.0061x^2-0.7393x+64.254/0.1631x+8.9386/100-$R1234ze−R32−R125), excluding the line segment DF; and refrigerant B having a composition ratio in which
(2)-1. 8.9 mass % ≥ x ≥ 8.3 mass %, and
(2)-2. the concentration of R32, R125, and $CF_3I$ (concentration of R32 (mass %)/concentration of R125 (mass %)/concentration of $CF_3I$ (mass %)) is within the range of a triangle having, as vertices, point G ($0.1667x+56.3/2.7778x^2-64.944x+357.98/100-$R1234ze−R32−R125), point D ($1.5625x^2-24.938x+155.98/0.0/100-$R1234ze−R32−R125), and point F ($-0.6667x+63.733/0.0/100-$R1234ze−R32−R125), excluding the line segment DF.

That is, refrigerant 7 is a mixed refrigerant.

When the above requirements are satisfied in the case in which the concentration x of HFO-1234ze is (1) 8.3 mass % ≥ x ≥ 4.0 mass % or (2) 8.9 mass % > x ≥ 8.3 mass %, refrigerant 7 has four types of performance, i.e., an excellent coefficient of performance and refrigerating capacity that allow it to serve as an alternative refrigerant for R410A, a sufficiently low GWP, and non-flammability. Specifically, refrigerant 7 has a coefficient of performance of 100% or more relative to R410A, a refrigerating capacity of 100% or more relative to R410A, a GWP of 750 or less, and WCF non-flammability performance.

Refrigerant 7 comprises R32, R125, $CF_3I$, and HFO-1234ze. In particular, the total amount of R32, R125, $CF_3I$, and HFO-1234ze in the entire refrigerant is preferably 99.5 mass % or more, more preferably 99.7 mass % or more, and most preferably 99.9 mass % or more. Examples of components other than R32, R125, $CF_3I$, and HFO-1234ze in the entire refrigerant include by-products that may be inevitably contained during the production of R32, R125, $CF_3I$, and HFO-1234ze.

The following describes the methods for determining points A, B, C, D, E, F, and G, which are classified according to the range of x. The technical meanings of points A, B, C, D, E, F, and G are as follows. Further, the concentration at each point is a value obtained in the Examples of Embodiment 7 (refrigerant 7) described later.

A: a composition ratio in which GWP=750, and the concentration of $CF_3I$ (mass %) is 0.0 mass %
B: a composition ratio in which GWP=750, and the concentration of R32 (mass %) is 0.0 mass %
C: a composition ratio in which the refrigerating capacity relative to R410A is 100% (a refrigerating capacity of 100% relative to R410A), and GWP=750
D: a composition ratio in which the refrigerating capacity relative to R410A is 100% (a refrigerating capacity of 100% relative to R410A), and the concentration of R125 (mass %) is 0.0 mass %
E: a WCF non-flammable composition ratio in which GWP=750
F: a WCF non-flammable composition ratio in which the concentration of R125 (mass %) is 0.0 mass %
G: a WCF non-flammable composition ratio in which the refrigerating capacity relative to R410A is 100% (a refrigerating capacity of 100% relative to R410A)

(1) Method for Determining Points C, D, E, F, and G (1-1) Point C 8.3 Mass %≥x≥4.0 Mass %

When the concentration of HFO-1234ze is 4.0 mass %, point C on a ternary composition diagram in which the total concentration of R32, R125, and $CF_3I$ is (100−x) mass % is concentration of R32 (mass %)/concentration of R125 (mass %)/concentration of $CF_3I$ (mass %)=(49.1/11.9/35.0);

when the concentration of HFO-1234yf is 6.0 mass %, point C on the ternary composition diagram in which the total concentration of R32, R125, and $CF_3I$ is (100−x) mass % is concentration of R32 (mass %)/concentration of R125 (mass %)/concentration of $CF_3I$ (mass %)=(52.9/11.2/29.9); and when the concentration of HFO-1234yf is 8.3 mass %, point C on the ternary composition diagram in which the total concentration of R32, R125, and $CF_3I$ is (100−x) mass % is (concentration of R32 (mass %)/concentration of R125 (mass %)/concentration of $CF_3I$ (mass %)=(57.7/10.3/23.7).

Therefore, when the total concentration of R32, R125, $CF_3I$, and HFO-1234ze is 100 mass %, assuming that the concentration of R32 is y mass %, the equation of the regression line obtained from the above three points plotted in the xy coordinates is represented by $y=0.0435x^2+1.4652x+42.543$.

Moreover, assuming that the concentration of R125 is y mass %, the equation of the regression line obtained in the same manner is represented by $y=-0.3726x+13.462$.

Therefore, the concentration of $CF_3I$ at point C is (100−R1234ze−R32−R125).

From the above, point C on the ternary composition diagram in which the total concentration of R32, R125, and $CF_3I$ is (100−x) (concentration of R32 (mass %)/concentration of R125 (mass %)/concentration of $CF_3I$ (mass %)) is represented by $(0.0435x+1.4652x+42.543/-0.3726x+13.462/100-R1234ze-R32-R125)$.

8.9 Mass %≥x>8.3 Mass %

The same calculation was performed for the above range of x. Table 8 below shows the results of point C (concentration of R32 (mass %)/concentration of R125 (mass %)/concentration of $CF_3I$ (mass %)) for each concentration range of x.

TABLE 8

Point C

| Item | 8.3 ≥ R1234ze ≥ 4.0 | | | 8.9 ≥ R1234ze ≥ 8.3 | | |
|---|---|---|---|---|---|---|
| R1234ze | 4.0 | 6.0 | 8.3 | 8.3 | 8.6 | 8.9 |
| R32 | 49.1 | 52.9 | 57.7 | 57.7 | 58.4 | 59.1 |
| R125 | 11.9 | 11.2 | 10.3 | 10.3 | 10.1 | 10.0 |
| CF3I | 35.0 | 29.9 | 23.7 | 23.7 | 22.9 | 22.0 |
| R1234ze | x | | | x | | |
| R32 approximate expression | $0.0435x^2 + 1.4652x + 42.543$ | | | $2.3333x + 38.333$ | | |
| R125 approximate expression | $-0.3726x + 13.406$ | | | $-0.5x + 14.433$ | | |
| CF3I approximate expression | 100−R1234ze−R32−R125 | | | 100−R1234ze−R32−R125 | | |

(1-2) Points D, E, F, and G

Points D, E, F, and G were determined below in the same manner as in the case of point C. The results are shown in Tables 9 to 12 below.

TABLE 9

Point D

| Item | 8.3 ≥ R1234ze ≥ 4.0 | | | 8.9 ≥ R1234ze ≥ 8.3 | | |
|---|---|---|---|---|---|---|
| R1234ze | 4.0 | 6.0 | 8.3 | 8.3 | 8.6 | 8.9 |
| R32 | 48.9 | 52.2 | 56.5 | 56.5 | 57.1 | 57.8 |
| R125 | 0 | 0 | 0 | 0 | 0 | 0 |
| CF3I | 47.1 | 41.8 | 35.4 | 35.4 | 34.3 | 33.3 |
| R1234ze | x | | | x | | |
| R32 approximate expression | $0.097x^2 + 0.6802x + 44.628$ | | | $1.5625x^2 − 24.938x + 155.98$ | | |
| R125 approximate expression | 0 | | | 0 | | |
| CF3I approximate expression | 100−R1234ze−R32−R125 | | | 100−R1234ze−R32−R125 | | |

TABLE 10

Point E

| Item | 8.3 ≥ R1234ze ≥ 4.0 | | | 8.9 ≥ R1234ze ≥ 8.3 | | |
|---|---|---|---|---|---|---|
| R1234ze | 4.0 | 6.0 | 8.3 | 8.3 | 8.6 | 8.9 |
| R32 | 61.2 | 59.6 | 57.7 | 57.7 | 57.4 | 57.2 |
| R125 | 9.6 | 9.9 | 10.3 | 10.3 | 10.3 | 10.3 |
| CF3I | 25.2 | 24.5 | 23.7 | 23.7 | 23.7 | 23.6 |
| R1234ze | x | | | x | | |
| R32 approximate expression | $-0.0061x^2 − 0.7393x + 64.254$ | | | $0.5556x^2 − 10.389x + 105.66$ | | |
| R125 approximate expression | $0.1631x + 8.9386$ | | | 10.3 | | |
| CF3I approximate expression | 100−R1234ze−R32−R125 | | | 100−R1234ze−R32−R125 | | |

TABLE 11

Point F

| Item | 8.3 ≥ R1234ze ≥ 4.0 | | | 8.9 ≥ R1234ze ≥ 8.3 | | |
|---|---|---|---|---|---|---|
| R1234ze | 4.0 | 6.0 | 8.3 | 8.3 | 8.6 | 8.9 |
| R32 | 61.7 | 60.1 | 58.2 | 58.2 | 58 | 57.8 |
| R125 | 0 | 0 | 0 | 0 | 0 | 0 |
| CF3I | 34.3 | 33.9 | 33.5 | 33.5 | 33.4 | 33.3 |
| R1234ze | x | | | x | | |
| R32 approximate expression | $-0.8143x + 64.967$ | | | $-0.6667x + 63.733$ | | |
| R125 approximate expression | 0 | | | 0 | | |
| CF3I approximate expression | 100−R1234ze−R32−R125 | | | 100−R1234ze−R32−R125 | | |

TABLE 12

Point G

| Item | 8.9 ≥ R1234ze ≥ 8.3 | | |
|---|---|---|---|
| R1234ze | 8.3 | 8.6 | 8.9 |
| R32 | 57.7 | 57.7 | 57.8 |
| R125 | 10.3 | 4.9 | 0 |
| CF3I | 23.7 | 28.8 | 33.3 |
| R1234ze | x | | |
| R32 approximate expression | $0.1667x + 56.3$ | | |
| R125 approximate expression | $2.7778x^2 − 64.944x + 357.98$ | | |
| CF3I approximate expression | 100 − R1234ze − R32 − R125 | | |

On the ternary composition diagram in which the total concentration of R32, R125, and $CF_3I$ is (100−x), a set of points with GWP=7500 is represented by a straight line connecting points A and B, which are presented as functions of x when HFO-1234ze=x. For example, on the ternary composition diagrams of FIGS. 10 to 14, the GWP is 750 or less in the regions on the vertex side of $CF_3I$ with respect to the straight line.

Further, on the ternary composition diagram in which the total concentration of R32, R125, and $CF_3I$ is (100−x), a set of points with a refrigerating capacity of 100% relative to R410A is approximated to a straight line connecting points C and D, which are presented as functions of x when HFO-1234ze=x. For example, on the ternary composition diagrams of FIGS. 10 to 14, the refrigerating capacity relative to R410A is 100% or more in the regions on the vertex side of R32 with respect to the approximate straight line.

Moreover, on the ternary composition diagram in which the total concentration of R32, R125, and $CF_3I$ is (100−x), a set of points with WCF non-flammability is approximated to a straight line connecting points E and F, which are presented as functions of x when HFO-1234ze=x. For example, on the ternary composition diagrams of FIGS. 10 to 14, it is WCF non-flammable in the regions on the vertex side of $CF_3I$ with respect to the approximate line.

Non-Flammability Limit (Identification of Line Segment EF)

First, the non-flammability limit of a binary mixed refrigerant of a flammable refrigerant (R32, 1234ze) and a non-flammable refrigerant ($CF_3I$, R125) was identified.

The non-flammability limit of the binary mixed refrigerant was determined based on the measurement equipment and measurement method of the flammability test according to ASTM E681-2009 (details are as described above).

As a result, in the mixed refrigerant of flammable refrigerant R32 and non-flammable refrigerant $CF_3I$, no flame propagation was observed from R32=65.0 wt % and $CF_3I$=35.0 wt %, and this formulation was regarded as the non-flammability limit. Further, no flame propagation was observed from R32=63.0 wt % and R125=37.0 wt % in the mixed refrigerant of flammable refrigerant R32 and non-flammable refrigerant R125, from 1234ze=80.0 wt % and $CF_3I$=20.0 wt % in the mixed refrigerant of flammable refrigerant 1234ze and non-flammable refrigerant $CF_3I$, and from 1234yf=79.0 wt % and R125=21.0 wt % in the mixed refrigerant of flammable refrigerant 1234ze and non-flammable refrigerant R125. These formulations were regarded as the non-flammability limits. The results are summarized in Table 13.

TABLE 13

| Item | Flammable refrigerant | Non-flammable refrigerant |
|---|---|---|
| Combination in binary mixed refrigerant | R32 | CF3I |
| Non-flammability limit (wt. %) | 65.0 | 35.0 |
| Combination in binary mixed refrigerant | R32 | R125 |
| Non-flammability limit (wt. %) | 63.0 | 37.0 |
| Combination in binary mixed refrigerant | 1234ze | CF3I |
| Non-flammability limit (wt. %) | 80.0 | 20.0 |
| Combination in binary mixed refrigerant | 1234ze | R125 |
| Non-flammability limit (wt. %) | 79.0 | 21.0 |

Points E and F showing the non-flammability limit were identified in such a manner that in the relationships of R32-equivalent flammable refrigerant=R32+(63/37)*(21/79)*R1234ze and R32-equivalent non-flammable refrigerant concentration=(63/37)*R125+(65/35)*$CF_3I$, a case in which R32-equivalent flammable refrigerant concentration−non-flammable refrigerant concentration<0 was determined to be non-flammable, and a case in which R32-equivalent flammable refrigerant concentration−non-flammable refrigerant concentration>0 was determined to be flammable.

Table 14 shows the details of points E and F. Line segment EF is a regression line connecting these two points E and F.

TABLE 14

| | | | | Point E | | | |
|---|---|---|---|---|---|---|---|
| R32 mass % | R125 mass % | CF3I mass % | R1234ze mass % | Flammable refrigerant concentration in terms of R32 mass % | Non-flammable refrigerant concentration in terms of R32 mass % | Flammability-non-flammability mass % | Determination |
| 61.2 | 9.6 | 25.2 | 4.0 | 63.010 | 63.146 | −0.135 | Non-flammable |
| 61.3 | 9.6 | 25.1 | 4.0 | 63.110 | 62.960 | 0.150 | Flammable |
| 59.6 | 9.9 | 24.5 | 60 | 62.316 | 62.357 | −0.041 | Non-flammable |
| 59.7 | 9.9 | 24.4 | 6.0 | 62.416 | 62.171 | 0.245 | Flammable |
| 57.7 | 10.3 | 23.7 | 8.3 | 61.457 | 61.552 | −0.095 | Non-flammable |
| 57.8 | 10.3 | 23.6 | 8.3 | 61.557 | 61.366 | 0.190 | Flammable |
| 57.4 | 10.3 | 23.7 | 8.6 | 61.293 | 61.552 | −0.260 | Non-flammable |
| 57.5 | 10.3 | 23.6 | 8.6 | 61.393 | 61.366 | 0.026 | Flammable |
| 57.2 | 10.3 | 23.6 | 8.9 | 61.228 | 61.366 | −0.138 | Non-flammable |
| 57.3 | 10.3 | 23.5 | 8.9 | 61.328 | 61.181 | 0.148 | Flammable |
| | | | | Point F | | | |
| R32 mass % | R125 mass % | CF3I mass % | R1234ze mass % | Flammable refrigerant concentration in terms of R32 mass % | Non-flammable refrigerant concentration in terms of R32 mass % | Flammability-non-flammability mass % | Determination |
| 61.7 | 0 | 34.3 | 4 | 63.510 | 63.700 | −0.190 | Non-flammable |
| 61.8 | 0 | 34.2 | 4 | 63.610 | 63.514 | 0.096 | Flammable |
| 60.1 | 0 | 33.9 | 6 | 62.816 | 62.957 | −0.141 | Non-flammable |
| 60.2 | 0 | 33.8 | 6 | 62.916 | 62.771 | 0.144 | Flammable |

TABLE 14-continued

| | | | | | | | |
|---|---|---|---|---|---|---|---|
| 58.2 | 0 | 33.5 | 8.3 | 61.957 | 62.214 | −0.258 | Non-flammable |
| 58.3 | 0 | 33.4 | 8.3 | 62.057 | 62.029 | 0.028 | Flammable |
| 58 | 0 | 33.4 | 8.6 | 61.893 | 62.029 | 0.136 | Non-flammable |
| 58.1 | 0 | 33.3 | 8.6 | 61.993 | 61.843 | 0.150 | Flammable |
| 57.8 | 0 | 33.4 | 8.9 | 61.828 | 62.029 | −0.200 | Non-flammable |
| 57.9 | 0 | 33.3 | 8.9 | 61.928 | 61.843 | 0.085 | Flammable |

1.2. Use

The refrigerant according to the present disclosure can be preferably used as a working fluid in a refrigerating machine.

The composition according to the present disclosure is suitable for use as an alternative refrigerant for R410A.

2. Refrigerant Composition

The refrigerant composition according to the present disclosure comprises at least the refrigerant according to the present disclosure, and can be used for the same use as the refrigerant according to the present disclosure. Moreover, the refrigerant composition according to the present disclosure can be further mixed with at least a refrigeration oil to thereby obtain a working fluid for a refrigerating machine.

The refrigerant composition according to the present disclosure further comprises at least one other component in addition to the refrigerant according to the present disclosure. The refrigerant composition according to the present disclosure may comprise at least one of the following other components, if necessary. As described above, when the refrigerant composition according to the present disclosure is used as a working fluid in a refrigerating machine, it is generally used as a mixture with at least a refrigeration oil. Therefore, it is preferable that the refrigerant composition according to the present disclosure does not substantially comprise a refrigeration oil. Specifically, in the refrigerant composition according to the present disclosure, the content of the refrigeration oil based on the entire refrigerant composition is preferably 0 to 1 mass %, and more preferably 0 to 0.1 mass %.

2.1. Water

The refrigerant composition according to the present disclosure may contain a small amount of water. The water content of the refrigerant composition is preferably 0 to 0.1 mass %, more preferably 0 to 0.075 mass %, even more preferably 0 to 0.05 mass %, and particularly preferably 0 to 0.025 mass %, based on the entire refrigerant.

A small amount of water contained in the refrigerant composition stabilizes double bonds in the molecules of unsaturated fluorocarbon compounds that can be present in the refrigerant, and makes it less likely that the unsaturated fluorocarbon compounds will be oxidized, thus increasing the stability of the refrigerant composition. From the viewpoint of obtaining the above effect due to inclusion of water, the lower limit of the water content is about 0.001 mass %. For example, the water content can be adjusted within the range of 0.001 to 0.1 mass %, 0.001 to 0.075 mass %, 0.001 to 0.05 mass %, or 0.001 to 0.025 mass %.

2.2. Tracer

A tracer is added to the refrigerant composition according to the present disclosure at a detectable concentration such that when the refrigerant composition has been diluted, contaminated, or undergone other changes, the tracer can trace the changes.

The refrigerant composition according to the present disclosure may comprise a single tracer, or two or more tracers.

The tracer is not limited, and can be suitably selected from commonly used tracers. It is preferable to select, as the tracer, a compound that cannot become an impurity inevitably mixed in the refrigerant according to the present disclosure.

Examples of tracers include hydrofluorocarbons, hydrochlorofluorocarbons, chlorofluorocarbons, hydrochlorocarbons, fluorocarbons, deuterated hydrocarbons, deuterated hydrofluorocarbons, perfluorocarbons, fluoroethers, brominated compounds, iodinated compounds, alcohols, aldehydes, ketones, and nitrous oxide ($N_2O$). The tracer is particularly preferably a hydrofluorocarbon, a hydrochlorofluorocarbon, a chlorofluorocarbon, a hydrochlorocarbon, a fluorocarbon, or a fluoroether.

Specifically, the following compounds are preferable as the tracer.

FC-14 (tetrafluoromethane, $CF_4$)
HCC-40 (chloromethane, $CH_3Cl$)
HFC-23 (trifluoromethane, $CHF_3$)
HFC-41 (fluoromethane, $CH_3Cl$)
HFC-125 (pentafluoroethane, $CF_3CHF_2$)
HFC-134a (1,1,1,2-tetrafluoroethane, $CF_3CH_2F$)
HFC-134 (1,1,2,2-tetrafluoroethane, $CHF_2CHF_2$)
HFC-143a (1,1,1-trifluoroethane, $CF_3CH_3$)
HFC-143 (1,1,2-trifluoroethane, $CHF_2CH_2F$)
HFC-152a (1,1-difluoroethane, $CHF_2CH_3$)
HFC-152 (1,2-difluoroethane, $CH_2FCH_2F$)
HFC-161 (fluoroethane, $CH_3CH_2F$)
HFC-245fa (1,1,1,3,3-pentafluoropropane, $CF_3CH_2CHF_2$)
HFC-236fa (1,1,1,3,3,3-hexafluoropropane, $CF_3CH_2CF_3$)
HFC-236ea (1,1,1,2,3,3-hexafluoropropane, $CF_3CHFCHF_2$)
HFC-227ea (1,1,1,2,3,3,3-heptafluoropropane, $CF_3CHFCF_3$)
HCFC-22 (chlorodifluoromethane, $CHClF_2$)
HCFC-31 (chlorofluoromethane, $CH_2ClF$)
CFC-1113 (chlorotrifluoroethylene, $CF_2=CClF$)
HFE-125 (trifluoromethyl-difluoromethyl ether, $CF_3OCHF_2$)
HFE-134a (trifluoromethyl-fluoromethyl ether, $CF_3OCH_2F$)
HFE-143a (trifluoromethyl-methyl ether, $CF_3OCH_3$)
HFE-227ea (trifluoromethyl-tetrafluoroethyl ether, $CF_3OCHFCF_3$)
HFE-236fa (trifluoromethyl-trifluoroethyl ether, $CF_3OCH_2CF_3$)

The tracer compound may be present at a total concentration of about 10 parts per million by weight (ppm) to about 1000 ppm in the refrigerant composition. The tracer compound is preferably present at a total concentration of about 30 ppm to about 500 ppm, and most preferably about 50 ppm to about 300 ppm, in the refrigerant composition.

2.3. Ultraviolet Fluorescent Dye

The refrigerant composition according to the present disclosure may comprise a single ultraviolet fluorescent dye, or two or more ultraviolet fluorescent dyes.

The ultraviolet fluorescent dye is not limited, and can be suitably selected from commonly used ultraviolet fluorescent dyes.

Examples of ultraviolet fluorescent dyes include naphthalimide, coumarin, anthracene, phenanthrene, xanthene, thioxanthene, naphthoxanthene, fluorescein, and derivatives thereof. The ultraviolet fluorescent dye is particularly preferably either naphthalimide or coumarin, or both.

2.4. Stabilizer

The refrigerant composition according to the present disclosure may comprise a single stabilizer, or two or more stabilizers.

The stabilizer is not limited, and can be suitably selected from commonly used stabilizers.

Examples of stabilizers include nitro compounds, ethers, and amines.

Examples of nitro compounds include aliphatic nitro compounds, such as nitromethane and nitroethane; and aromatic nitro compounds, such as nitro benzene and nitro styrene.

Examples of ethers include 1,4-dioxane.

Examples of amines include 2,2,3,3,3-pentafluoropropylamine and diphenylamine.

Examples of stabilizers also include butylhydroxyxylene and benzotriazole.

The content of the stabilizer is not limited. Generally, the content of the stabilizer is preferably 0.01 to 5 mass %, and more preferably 0.05 to 2 mass %, based on the entire refrigerant.

2.5. Polymerization Inhibitor

The refrigerant composition according to the present disclosure may comprise a single polymerization inhibitor, or two or more polymerization inhibitors.

The polymerization inhibitor is not limited, and can be suitably selected from commonly used polymerization inhibitors.

Examples of polymerization inhibitors include 4-methoxy-1-naphthol, hydroquinone, hydroquinone methyl ether, dimethyl-t-butylphenol, 2,6-di-tert-butyl-p-cresol, and benzotriazole.

The content of the polymerization inhibitor is not limited. Generally, the content of the polymerization inhibitor is preferably 0.01 to 5 mass %, and more preferably 0.05 to 2 mass %, based on the entire refrigerant.

3. Refrigeration Oil-Containing Working Fluid

The refrigeration oil-containing working fluid according to the present disclosure comprises at least the refrigerant or refrigerant composition according to the present disclosure and a refrigeration oil, for use as a working fluid in a refrigerating machine. Specifically, the refrigeration oil-containing working fluid according to the present disclosure is obtained by mixing a refrigeration oil used in a compressor of a refrigerating machine with the refrigerant or the refrigerant composition. The refrigeration oil-containing working fluid generally comprises 10 to 50 mass % of refrigeration oil.

3.1. Refrigeration Oil

The composition according to the present disclosure may comprise a single refrigeration oil, or two or more refrigeration oils.

The refrigeration oil is not limited, and can be suitably selected from commonly used refrigeration oils. In this case, refrigeration oils that are superior in the action of increasing the miscibility with the mixture and the stability of the mixture, for example, are suitably selected as necessary.

The base oil of the refrigeration oil is preferably, for example, at least one member selected from the group consisting of polyalkylene glycols (PAG), polyol esters (POE), and polyvinyl ethers (PVE).

The refrigeration oil may further contain additives in addition to the base oil. The additive may be at least one member selected from the group consisting of antioxidants, extreme-pressure agents, acid scavengers, oxygen scavengers, copper deactivators, rust inhibitors, oil agents, and antifoaming agents.

A refrigeration oil with a kinematic viscosity of 5 to 400 cSt at 40° C. is preferable from the standpoint of lubrication.

The refrigeration oil-containing working fluid according to the present disclosure may further optionally contain at least one additive. Examples of additives include the compatibilizing agents described below.

3.2. Compatibilizing Agent

The refrigeration oil-containing working fluid according to the present disclosure may comprise a single compatibilizing agent, or two or more compatibilizing agents.

The compatibilizing agent is not limited, and can be suitably selected from commonly used compatibilizing agents.

Examples of compatibilizing agents include polyoxyalkylene glycol ethers, amides, nitriles, ketones, chlorocarbons, esters, lactones, aryl ethers, fluoroethers, and 1,1,1-trifluoroalkanes. The compatibilizing agent is particularly preferably a polyoxyalkylene glycol ether.

4. Method for Operating Refrigerating Machine

The method for operating a refrigerating machine according to the present disclosure is a method for operating a refrigerating machine using the refrigerant according to the present disclosure.

Specifically, the method for operating a refrigerating machine according to the present disclosure comprises circulating the refrigerant according to the present disclosure in a refrigerating machine.

The embodiments are described above; however, it will be understood that various changes in forms and details can be made without departing from the spirit and scope of the claims.

EXAMPLES

The present disclosure is described in more detail below with reference to Examples. However, the present disclosure is not limited to the Examples.

In the Examples and Comparative Examples, the GWP of mixed refrigerants was evaluated based on the values stated in the Intergovernmental Panel on Climate Change (IPCC), fourth report. The GWP of HFO-1132(E), which was not stated therein, was assumed to be 1 from HFO-1132a (GWP=1 or less) and HFO-1123 (GWP=0.3, described in PTL 1). The refrigerating capacity of the mixed refrigerants was determined by performing theoretical refrigeration cycle calculations for the mixed refrigerants using the National Institute of Science and Technology (NIST) and Reference Fluid Thermodynamic and Transport Properties Database (Refprop 9.0) under the following conditions.

Evaporating temperature: 5° C.
Condensation temperature: 45° C.
Superheating temperature: 5K
Subcooling temperature: 5K
Compressor efficiency: 70%

Further, the coefficient of performance (COP) of the mixed refrigerants was calculated according to the following equation.

$$COP = \text{(refrigerating capacity or heating capacity)} / \text{amount of electrical power consumed}$$

Examples and Comparative Examples of Embodiment 1 (Refrigerant 1)

Mixed refrigerants were prepared by mixing R32 and $CF_3I$ at mass % shown in Table 15 based on the sum of them.

TABLE 15

| Example/ Comparative Example | Composition ratio (mass %) | | GWP | COP ratio (%) (relative to R32) | Refrigerating capacity ratio (%) (relative to R32) | Temperature glide (K) | Flammable/ non-flammable (ASHRAE) |
|---|---|---|---|---|---|---|---|
| | CF3I | HFC-32 | | | | | |
| Comparative Example 1 | 0 | 100 | 675 | 100 | 100 | 0 | Slightly flammable |
| Comparative Example 2 | 40 | 60 | 405 | 98.3 | 97.1 | 0.2 | Slightly flammable |
| Comparative Example 3 | 41 | 59 | 399 | 98.3 | 96.9 | 0.2 | Slightly flammable |
| Comparative Example 4 | 42 | 58 | 392 | 98.3 | 96.7 | 0.2 | Slightly flammable |
| Comparative Example 5 | 43 | 57 | 385 | 98.2 | 96.5 | 0.3 | Slightly flammable |
| Comparative Example 6 | 44 | 56 | 378 | 98.2 | 96.2 | 0.3 | Slightly flammable |
| Comparative Example 7 | 45 | 55 | 372 | 98.2 | 96.0 | 0.4 | Slightly flammable |
| Example 1 | 46 | 54 | 365 | 98.1 | 95.7 | 0.4 | Non-flammable |
| Example 2 | 47 | 53 | 358 | 98.1 | 95.4 | 0.5 | Non-flammable |
| Example 3 | 48 | 52 | 351 | 98.1 | 95.1 | 0.6 | Non-flammable |
| Comparative Example 8 | 49 | 51 | 345 | 98.0 | 94.8 | 0.7 | Non-flammable |
| Comparative Example 9 | 50 | 50 | 338 | 98.0 | 94.4 | 0.8 | Non-flammable |
| Comparative Example 10 | 100 | 0 | 1 | 109.5 | 31.1 | 0.0 | Non-flammable |

Due to the predetermined formulation, refrigerant 1 has four types of performance, i.e., an excellent coefficient of performance and refrigerating capacity that allow it to serve as an alternative refrigerant for R410A, a sufficiently low GWP, and non-flammability. Specifically, it was revealed that the mixed refrigerants of Examples 1 to 3, which were specific examples of refrigerant 1, had a coefficient of performance of 98% or more relative to R32, a refrigerating capacity of 95% or more relative to R32, a GWP of 750 or less (particularly 400 or less), and ASHRAE non-flammability performance.

Examples and Comparative Examples of Embodiment 2 (Refrigerant 2)

Mixed refrigerants were prepared by mixing R32, R125, and $CF_3I$ at mass % shown in Table 16 based on the sum of them.

TABLE 16

| Example/ Comparative Example | Point | Composition ratio (mass %) | | | GWP | COP ratio (%) (relative to R32) | Refrigerating capacity ratio (%) (relative to R32) | Temperature glide (K) | Flammable/ non-flammable (WCF) |
|---|---|---|---|---|---|---|---|---|---|
| | | CF3I | HFC-32 | HFC-125 | | | | | |
| Comparative Example 1 | | 0 | 100 | 0 | 675 | 100 | 100 | 0 | Slightly flammable |
| Comparative Example 11 | A | 2.6 | 97.4 | 0 | 750 | 99.9 | 99.7 | 0.0 | Slightly flammable |
| Comparative Example 12 | B | 0 | 21.4 | 78.6 | 750 | 105.6 | 45.9 | 11.0 | Non-flammable |
| Comparative Example 13 | C | 0 | 63.0 | 37.0 | 1720 | 98.5 | 94.3 | 1.0 | Non-flammable |
| Example 4 | D | 35.0 | 65.0 | 0 | 439 | 98.5 | 97.9 | 0.1 | Non-flammable |
| Example 5 | X | 26.5 | 64.6 | 8.9 | 750 | 98.4 | 97.1 | 0.1 | Non-flammable |
| Example 6 | E | 35.3 | 53.7 | 11.0 | 750 | 98.0 | 95.0 | 0.2 | Non-flammable |
| Example 7 | | 40.3 | 52.7 | 7.0 | 601 | 98.0 | 95.0 | 0.3 | Non-flammable |
| Example 8 | F | 48.4 | 51.6 | 0 | 349 | 98.1 | 95.0 | 0.6 | Non-flammable |

TABLE 16-continued

| Example/ Comparative Example | Point | Composition ratio (mass %) CF3I | HFC-32 | HFC-125 | GWP | COP ratio (%) (relative to R32) | Refrigerating capacity ratio (%) (relative to R32) | Temperature glide (K) | Flammable/ non-flammable (WCF) |
|---|---|---|---|---|---|---|---|---|---|
| Example 9 | | 36.5 | 53.5 | 10.0 | 711 | 98.0 | 95.0 | 0.3 | Non-flammable |
| Comparative Example 14 | | 20.0 | 70.0 | 10.0 | 823 | 98.7 | 97.6 | 0.0 | Slightly flammable |

Due to the predetermined formulation, refrigerant 2 has four types of performance, i.e., an excellent coefficient of performance and refrigerating capacity that allow it to serve as an alternative refrigerant for R410A, a sufficiently low GWP, and non-flammability. Specifically, it was revealed that the mixed refrigerants of Examples 4 to 9, which were specific examples of refrigerant 2, had a coefficient of performance of 98% or more relative to R32, a refrigerating capacity of 95% or more relative to R32, a GWP of 750 or less (particularly 600 or less), and WCF non-flammability performance.

Due to the predetermined formulation, refrigerant 3 has four types of performance, i.e., an excellent coefficient of performance and refrigerating capacity that allow it to serve as an alternative refrigerant for R410A, a sufficiently low GWP, and non-flammability. Specifically, it was revealed that the mixed refrigerants of Examples 10 to 14, which were specific examples of refrigerant 3, had a coefficient of performance of 100% or more (particularly 105% or more) relative to R410A, a refrigerating capacity of 65% or more relative to R410A, a GWP of 1 or less, and WCF non-flammability performance.

Examples and Comparative Examples of Embodiment 3 (Refrigerant 3)

Mixed refrigerants were prepared by mixing HFO-1132 (E) and $CF_3I$ at mass % shown in Table 17 based on the sum of them.

Examples and Comparative Examples of Embodiment 4 (Refrigerant 4)

Mixed refrigerants were prepared by mixing R32, HFO-1132(E), and $CF_3I$ at mass % shown in Table 18 based on the sum of them.

TABLE 17

| Example/ Comparative Example | Composition ratio (mass %) CF3I | E-HFO-1132 | GWP | COP ratio (%) (relative to R410A) | Refrigerating capacity ratio (%) (relative to R410A) | Temperature glide (K) | Flammable/ non-flammable (WCF) |
|---|---|---|---|---|---|---|---|
| Comparative Example 1 | HFC – 32 = 100 | | 675 | 102.4 | 109.8 | 0 | Slightly flammable |
| Comparative Example 15 | R410A | | 2088 | 100 | 100 | 0.1 | Non-flammable |
| Comparative Example 15 | 0 | 100 | 1 | 97.8 | 97.6 | 0 | Weakly flammable |
| Comparative Example 16 | 60 | 40 | 1 | 105.6 | 69.0 | 1.0 | Slightly flammable |
| Comparative Example 17 | 61 | 39 | 1 | 105.7 | 68.4 | 9.6 | Slightly flammable |
| Example 10 | 62 | 38 | 1 | 105.9 | 67.7 | 9.7 | Non-flammable |
| Example 11 | 63 | 37 | 1 | 106.1 | 67.1 | 9.8 | Non-flammable |
| Comparative Example 12 | 64 | 36 | 1 | 106.2 | 66.4 | 9.9 | Non-flammable |
| Example 13 | 65 | 35 | 1 | 106.4 | 65.7 | 10.0 | Non-flammable |
| Example 14 | 66 | 34 | 1 | 106.6 | 65.0 | 10.0 | Non-flammable |
| Comparative Example 18 | 67 | 33 | 1 | 106.8 | 64.4 | 10.1 | Non-flammable |
| Comparative Example 19 | 68 | 32 | 1 | 106.9 | 63.6 | 10.2 | Non-flammable |
| Comparative Example 20 | 69 | 31 | 1 | 107.1 | 62.9 | 10.2 | Non-flammable |
| Comparative Example 21 | 70 | 30 | 1 | 107.3 | 62.2 | 10.3 | Non-flammable |
| Comparative Example 10 | 100 | 0 | 1 | 112.1 | 34.1 | 0.0 | Non-flammable |

TABLE 18

| Example/Comparative Example | Point | Composition ratio (mass %) CF3I | E-HFO-1132 | HFC-32 | GWP | COP ratio (%) (relative to R32) | Refrigerating capacity ratio (%) (relative to R32) | Temperature glide (K) | Flammable/non-flammable (WCF) |
|---|---|---|---|---|---|---|---|---|---|
| Comparative Example 1 | | 0 | 0 | 100 | 675 | 100 | 100 | 0 | Slightly flammable |
| Comparative Example 15 | | 0 | 100 | 0 | 1 | 97.8 | 97.6 | 0 | Weakly flammable |
| Comparative Example 22 | G | 62 | 38 | 0 | 1 | 105.9 | 67.7 | 9.7 | Non-flammable |
| Example 15 | H | 35 | 0 | 65 | 439 | 100.8 | 107.5 | 0.1 | Non-flammable |
| Comparative Example 23 | I | 40.6 | 59.4 | 0 | 1 | 102.4 | 80.0 | 6.6 | Slightly flammable |
| Example 16 | Y | 58.1 | 32.5 | 9.4 | 64 | 102.6 | 80.0 | 11.7 | Non-flammable |
| Example 17 | | 67.8 | 17.2 | 15 | 102 | 102.6 | 80.0 | 13.7 | Non-flammable |
| Example 18 | J | 77.2 | 0 | 22.8 | 155 | 100.2 | 80.0 | 13.1 | Non-flammable |
| Example 19 | | 55 | 25 | 20 | 136 | 99.4 | 88.6 | 9.0 | Non-flammable |
| Comparative Example 24 | | 70 | 20 | 10 | 68 | 104.6 | 74.9 | 15.2 | Non-flammable |
| Comparative Example 25 | | 40 | 30 | 30 | 203 | 97.5 | 99.7 | 4.1 | Slightly flammable |

Due to the predetermined formulation, refrigerant 4 has four types of performance, i.e., an excellent coefficient of performance and refrigerating capacity that allow it to serve as an alternative refrigerant for R410A, a sufficiently low GWP, and non-flammability. Specifically, it was revealed that the mixed refrigerants of Examples 15 to 19, which were specific examples of refrigerant 4, had a coefficient of performance of 99% or more relative to R32, a refrigerating capacity of 80% or more relative to R32, a GWP of 750 or less (particularly 450 or less), and WCF non-flammability performance.

Examples and Comparative Examples of Embodiment 5 (Refrigerant 5)

Mixed refrigerants were prepared by mixing R32, HFO-1123, and $CF_3I$ at mass % shown in Table 19 based on the sum of them.

TABLE 19

| Example/Comparative Example | Point | Composition ratio (mass %) CF3I | HFO-1123 | HFC-32 | GWP | COP ratio (%) (relative to R32) | Refrigerating capacity ratio (%) (relative to R32) | Temperature glide (K) | Flammable/non-flammable (WCF) |
|---|---|---|---|---|---|---|---|---|---|
| Comparative Example 1 | | 0 | 0 | 100 | 675 | 100 | 100 | 0 | Slightly flammable |
| Comparative Example 26 | | 0 | 100 | 0 | 0.3 | 90.6 | 108.0 | 0 | Slightly flammable |
| Comparative Example 27 | K | 45 | 55 | 0 | 0.7 | 103.0 | 73.9 | 12.8 | Non-flammable |
| Example 20 | L | 35 | 0 | 65 | 439 | 100.8 | 107.5 | 0.1 | Non-flammable |
| Comparative Example 28 | M | 46.5 | 53.5 | 0 | 0.6 | 101.0 | 80.0 | 11.4 | Slightly flammable |
| Example 21 | Z | 53.5 | 41.6 | 4.9 | 34 | 101.6 | 80.0 | 12.7 | Non-flammable |
| Example 22 | | 65.6 | 20.9 | 13.5 | 92 | 102.1 | 80.0 | 13.9 | Non-flammable |
| Example 23 | N | 77.2 | 0 | 22.8 | 155 | 100.2 | 80.0 | 13.1 | Non-flammable |
| Example 24 | | 55 | 30 | 15 | 102 | 99.5 | 86.3 | 10.5 | Non-flammable |
| Comparative Example 29 | | 70 | 20 | 10 | 68 | 104.3 | 75.0 | 16.2 | Non-flammable |
| Comparative Example 30 | | 40 | 40 | 20 | 136 | 96.8 | 96.6 | 5.8 | Slightly flammable |

Due to the predetermined formulation, refrigerant 5 has four types of performance, i.e., an excellent coefficient of performance and refrigerating capacity that allow it to serve as an alternative refrigerant for R410A, a sufficiently low GWP, and non-flammability. Specifically, it was revealed that the mixed refrigerants of Examples 20 to 24, which were specific examples of refrigerant 5, had a coefficient of performance of 99% or more relative to R32, a refrigerating capacity of 80% or more relative to R32, a GWP of 750 or less (particularly 450 or less), and WCF non-flammability performance.

Examples and Comparative Examples of Embodiment 6 (Refrigerant 6)

Mixed refrigerants were prepared by mixing R32, R125, HFO-1234yf, and $CF_3I$ at mass % shown in Table 20 (R1234yf=6 mass %), Table 21 (R1234yf=9 mass %), Table 22 (R1234yf=11.7 mass %), Table 23 (R1234yf=12.1 mass %), and Table 24 (R1234yf=12.6 mass %) based on the sum of them.

TABLE 20

| Item | Unit | Comparative Example 1 R410A | Comparative Example A | Comparative Example B | Example C | Comparative Example D | Example E | Comparative Example F |
|---|---|---|---|---|---|---|---|---|
| R32 | mass % | 50 | 90.0 | 0.0 | 48.2 | 48.0 | 59.6 | 60.1 |
| R125 | mass % | 50 | 4.0 | 21.4 | 12.1 | 0.0 | 9.9 | 0.0 |
| CF3I | mass % | 0 | 0.0 | 72.6 | 33.7 | 46.0 | 24.5 | 33.9 |
| R1234yf | mass % | 0 | 6.0 | 6.0 | 6.0 | 6.0 | 6.0 | 6.0 |
| COP ratio (relative to R410A) | % | 100 | 102 | 108 | 100 | 100 | 101 | 101 |
| Refrigerating capacity ratio (relative to R410A) | % | 100 | 107 | 50 | 100 | 100 | 103 | 104 |
| GWP | — | 2088 | 750 | 750 | 750 | 325 | 750 | 406 |
| Flammability | | Non-flammable | Flammable | Non-flammable | Non-flammable | Non-flammable | Non-flammable | Non-flammable |

TABLE 21

| Item | Unit | Comparative Example 1 R410A | Comparative Example A | Comparative Example B | Example C | Comparative Example D | Example E | Comparative Example F |
|---|---|---|---|---|---|---|---|---|
| R32 | mass % | 50 | 86.2 | 0.0 | 5.17 | 50.8 | 57.1 | 57.7 |
| R125 | mass % | 50 | 4.8 | 21.4 | 11.4 | 0.0 | 10.4 | 0.0 |
| CF3I | mass % | 0 | 0.0 | 69.6 | 27.9 | 40.2 | 23.5 | 33.3 |
| R1234yf | mass % | 0 | 9.0 | 9.0 | 9.0 | 9.0 | 9.0 | 9.0 |
| COP rato (relative to R410A) | % | 100 | 102 | 107 | 101 | 101 | 101 | 101 |
| Refrigerating capacity ratio (relative to R410A) | % | 100 | 106 | 50 | 100 | 100 | 102 | 102 |
| GWP | — | 2088 | 750 | 750 | 750 | 344 | 750 | 390 |
| Flammability | | Non-flammable | Flammable | Non-flammable | Non-flammable | Non-flammable | Non-flammable | Non-flammable |

TABLE 22

| Item | Unit | Comparative Example 1 R410A | Comparative Example A | Comparative Example B | Example C = E = G | Comparative Example D | Comparative Example F |
|---|---|---|---|---|---|---|---|
| R32 | mass % | 50 | 82.9 | 0.0 | 54.9 | 53.7 | 55.5 |
| R125 | mass % | 50 | 5.4 | 21.4 | 10.8 | 0.0 | 0.0 |
| CF3I | mass % | 0 | 0.0 | 66.9 | 22.6 | 34.6 | 32.8 |
| R1234yf | mass % | 0 | 11.7 | 11.7 | 11.7 | 11.7 | 11.7 |
| COP ratio (relative to R410A) | % | 100 | 102 | 107 | 101 | 101 | 101 |
| Refrigerating capacity ratio (relative to R410A) | % | 100 | 105 | 49 | 100 | 100 | 101 |
| GWP | — | 2088 | 750 | 750 | 750 | 363 | 375 |
| Flammability | | Non-flammable | Flammable | Non-flammable | Non-flammable | Non-flammable | Non-flammable |

TABLE 23

| Item | Unit | Comparative Example 1 R410A | Comparative Example A | Comparative Example B | Example C | Comparative Example D | Example E | Comparative Example F | Example G |
|---|---|---|---|---|---|---|---|---|---|
| R32 | mass % | 50 | 82.4 | 0.0 | 55.5 | 54.3 | 54.6 | 55.2 | 54.9 |
| R125 | mass % | 50 | 5.5 | 21.4 | 10.7 | 0.0 | 10.9 | 0.0 | 5.4 |
| CF3I | mass % | 0 | 0.0 | 65.9 | 21.7 | 33.6 | 22.4 | 32.7 | 27.6 |
| R1234yf | mass % | 0 | 12.1 | 12.1 | 12.1 | 12.1 | 12.1 | 12.1 | 12.1 |
| COP ratio (relative to R410A) | % | 100 | 102 | 107 | 101 | 101 | 101 | 101 | 101 |
| Refrigerating capacity ratio (relative to R410A) | % | 100 | 105 | 49 | 100 | 100 | 100 | 100 | 100 |
| GWP | — | 2088 | 750 | 750 | 750 | 367 | 750 | 373 | 560 |
| Flammability | | Non-flammable | Flammable | Non-flammable | Non-flammable | Non-flammable | Non-flammable | Non-flammable | Non-flammable |

TABLE 24

| Item | Unit | Comparative Example 1 R410A | Comparative Example A | Comparative Example B | Example C | Comparative Example D = F = G | Example E |
|---|---|---|---|---|---|---|---|
| R32 | mass % | 50 | 81.8 | 0.0 | 56.4 | 54.8 | 54.2 |
| R125 | mass % | 50 | 5.6 | 21.4 | 10.5 | 0.0 | 10.9 |
| CF3I | mass % | 0 | 0.0 | 65.9 | 20.5 | 32.6 | 22.3 |
| R1234yf | mass % | 0 | 12.6 | 12.6 | 12.6 | 12.6 | 12.6 |
| COP ratio (relative to R410A) | % | 100 | 102 | 107 | 101 | 101 | 101 |
| Refrigerating capacity ratio (relative to R410A) | % | 100 | 105 | 49 | 100 | 100 | 99 |
| GWP | — | 2088 | 750 | 750 | 750 | 371 | 750 |
| Flammability | | Non-flammable | Flammable | Non-flammable | Non-flammable | Non-flammable | Non-flammable |

When the above requirements are satisfied in the case in which the concentration x of HFO-1234yfx is (1) 11.7 mass %≥x≥6.0 mass % or (2) 12.6 mass %≥x≥11.7 mass %, refrigerant 6 has four types of performance, i.e., an excellent coefficient of performance and refrigerating capacity that allow it to serve as an alternative refrigerant for R410A, a sufficiently low GWP, and non-flammability. Specifically, it was revealed that the mixed refrigerants of the Examples in the above tables, which were specific examples of refrigerant 6, had a coefficient of performance of 100% or more relative to R410A, a refrigerating capacity of 100% or more relative to R410A, a GWP of 750 or less, and WCF non-flammability performance.

Examples and Comparative Examples of Embodiment 7 (Refrigerant 7)

Mixed refrigerants were prepared by mixing R32, R125, HFO-1234ze, and $CF_3I$ at mass % shown in Table 25 (R1234ze=4 mass %), Table 26 (R1234ze=6 mass %), Table 27 (R1234ze=8.3 mass %), Table 28 (R1234ze=8.6 mass %), and Table 29 (R1234ze=8.9 mass %) based on the sum of them.

TABLE 25

| Item | Unit | Comparative Example 1 R410A | Comparative Example A | Comparative Example B | Example C | Comparative Example D | Example E | Comparative Example F |
|---|---|---|---|---|---|---|---|---|
| R32 | mass % | 50 | 92.4 | 0.0 | 49.1 | 48.9 | 61.2 | 61.7 |
| R125 | mass % | 50 | 3.6 | 21.4 | 11.9 | 0.0 | 9.6 | 0.0 |
| CF3I | mass % | 0 | 0.0 | 74.6 | 35.0 | 47.1 | 25.2 | 34.3 |
| R1234ze | mass % | 0 | 4.0 | 4.0 | 4.0 | 4.0 | 4.0 | 4.0 |
| COP ratio (relative to R410A) | % | 100 | 102 | 108 | 100 | 100 | 101 | 101 |
| Refrigerating capacity ratio (relative to R410A) | % | 100 | 107 | 49 | 100 | 100 | 103 | 104 |
| GWP | — | 2088 | 750 | 750 | 750 | 331 | 750 | 417 |
| Flammabifty | | Non-flammable | Flammable | Non-flammable | Non-flammable | Non-flammable | Non-flammable | Non-flammable |

TABLE 26

| Item | Unit | Comparative Example 1 R410A | Comparative Example A | Comparative Example B | Example C | Comparative Example D | Example E | Comparative Example F |
|---|---|---|---|---|---|---|---|---|
| R32 | mass % | 50 | 90.0 | 0.0 | 52.9 | 52.2 | 59.6 | 60.1 |
| R125 | mass % | 50 | 4.0 | 21.4 | 11.2 | 0.0 | 9.9 | 0.0 |
| CF3I | mass % | 0 | 0.0 | 72.6 | 29.9 | 41.8 | 24.5 | 33.9 |
| R1234ze | mass % | 0 | 6.0 | 6.0 | 6.0 | 6.0 | 6.0 | 6.0 |
| COP ratio (relative to R410A) | % | 100 | 102 | 108 | 101 | 101 | 101 | 101 |
| Refrigerating capacity ratio (relative to R410A) | % | 100 | 106 | 49 | 100 | 100 | 102 | 102 |
| GWP | — | 2088 | 750 | 750 | 750 | 353 | 750 | 406 |
| Flammability | | Non-flammable | Flammable | Non-flammable | Non-flammable | Non-flammable | Non-flammable | Non-flammable |

TABLE 27

| Item | Unit | Comparative Example 1 R410A | Comparative Example A | Comparative Example B | Example C = E = G | Comparative Example D | Comparative Example F |
|---|---|---|---|---|---|---|---|
| R32 | mass % | 50 | 87.4 | 0.0 | 57.5 | 56.5 | 58.2 |
| R125 | mass % | 50 | 4.5 | 21.4 | 10.3 | 0.0 | 0.0 |
| CF3I | mass % | 0 | 0.0 | 70.5 | 24.1 | 35.4 | 33.5 |
| R1234ze | mass % | 0 | 8.3 | 8.3 | 8.3 | 8.3 | 8.3 |
| COP ratio (relative to R410A) | % | 100 | 102 | 108 | 101 | 101 | 101 |
| Refrigerating capacity ratio (relative to R410A) | % | 100 | 105 | 49 | 100 | 100 | 101 |
| GWP | — | 2088 | 750 | 750 | 750 | 382 | 394 |
| Flammability | | Non-flammable | Flammable | Non-flammable | Non-flammable | Non-flammable | Non-flammable |

TABLE 28

| Item | Unit | Comparative Example 1 R410A | Comparative Example A | Comparative Example B | Example C | Comparative Example D | Example E | Comparative Example F | Example G |
|---|---|---|---|---|---|---|---|---|---|
| R32 | mass % | 50 | 86.7 | 0.0 | 58.4 | 57.1 | 57.4 | 58.0 | 57.7 |
| R125 | mass % | 50 | 4.7 | 21.4 | 10.1 | 0.0 | 10.3 | 0.0 | 4.9 |
| CF3I | mass % | 0 | 0.0 | 70.0 | 22.9 | 34.3 | 23.7 | 33.4 | 28.8 |
| R1234ze | mass % | 0 | 8.6 | 8.6 | 8.6 | 8.6 | 8.6 | 8.6 | 8.6 |
| COP ratio (relative to R410A) | % | 100 | 102 | 108 | 101 | 101 | 101 | 101 | 101 |
| Reingerating capacity ratio (relative to R410A) | % | 100 | 104 | 49 | 100 | 100 | 100 | 100 | 100 |
| GWP | — | 2088 | 750 | 750 | 748 | 386 | 750 | 392 | 562 |
| Flammability | | Non-flammable | Flammable | Non flammable | Non-flammable | Non-flammable | Non-flammable | Non-flammatte | Non-flammable |

TABLE 29

| Item | Unit | Comparative Example 1 R410A | Comparative Example A | Comparative Example B | Example C | Comparative Example D = F = G | Example E |
|---|---|---|---|---|---|---|---|
| R32 | mass % | 50 | 86.4 | 0.0 | 59.1 | 57.8 | 57.2 |
| R125 | mass % | 50 | 4.7 | 21.4 | 10.0 | 0.0 | 10.3 |
| CF3I | mass % | 0 | 0.0 | 70.5 | 22.0 | 33.3 | 23.6 |
| R1234ze | mass % | 0 | 8.9 | 8.1 | 8.9 | 8.9 | 8.9 |
| COP ratio (relative to R410A) | % | 100 | 102 | 108 | 101 | 101 | 101 |
| Refrigerating capacity ratio (relative to R410A) | % | 100 | 104 | 49 | 100 | 100 | 100 |

TABLE 29-continued

| Item | Unit | Comparative Example 1 R410A | Comparative Example A | Comparative Example B | Example C | Comparative Example D = F = G | Example E |
|---|---|---|---|---|---|---|---|
| GWP | — | 2088 | 750 | 750 | 750 | 391 | 750 |
| Flammability | | Non-flammable | Flammable | Non-flammable | Non-flammable | Non-flammable | Non flammable |

When the above requirements are satisfied in the case in which the concentration x of HFO-1234ze is (1) 8.3 mass %≥x≥4.0 mass % or (2) 8.9 mass %>x≥8.3 mass %, refrigerant 7 has four types of performance, i.e., an excellent coefficient of performance and refrigerating capacity that allow it to serve as an alternative refrigerant for R410A, a sufficiently low GWP, and non-flammability. Specifically, it was revealed that the mixed refrigerants of the Examples in the above tables, which were specific examples of refrigerant 7, had a coefficient of performance of 100% or more relative to R410A, a refrigerating capacity of 100% or more relative to R410A, a GWP of 750 or less, and WCF non-flammability performance.

REFERENCE SIGNS LIST

1: Ignition source
2: Sample inlet
3: Springs
4: 12-liter glass flask
5: Electrodes
6: Stirrer
7: Insulated chamber
A: A composition ratio in which GWP=750, and the concentration of $CF_3I$ (mass %) is 0.0 mass %
B: A composition ratio in which GWP=750, and the concentration of R32 (mass %) is 0.0 mass %
C: A composition ratio in which the refrigerating capacity relative to R410A is 100% (a refrigerating capacity of 100% relative to R410A), and GWP=750
D: A composition ratio in which the refrigerating capacity relative to R410A is 100% (a refrigerating capacity of 100% relative to R410A), and the concentration of R125 (mass %) is 0.0 mass %
E: A WCF non-flammable composition ratio in which GWP=750
F: A WCF non-flammable composition ratio in which the concentration of R125 (mass %) is 0.0 mass %
G: A WCF non-flammable composition ratio in which the refrigerating capacity relative to R410A is 100% (a refrigerating capacity of 100% relative to R410A)

The invention claimed is:

1. A composition comprising a refrigerant, the refrigerant comprising trifluoroiodomethane ($CF_3I$) and trans-1,2-difluoroethylene (HFO-1132(E)), wherein the contents of CF3I and HFO-1132(E) in the refrigerant are respectively 66 mass %≥$CF_3I$≥62 mass % and 38 mass %≥HFO-1132(E)≥34mass %, based on the total amount of $CF_3I$ and HFO-1132(E) taken as 100 mass %.

2. The composition according to claim 1, wherein the refrigerant is a working fluid for a refrigerating machine, wherein the composition further comprises a refrigeration oil.

3. The composition according to claim 1, wherein the refrigerant is an alternative refrigerant for R410A.

4. A refrigerating machine comprising the composition according to claim 1 as a working fluid.

5. A method for operating a refrigerating machine, comprising circulating the composition according to claim 1 as a working fluid in a refrigerating machine.

* * * * *